United States Patent
Crockett et al.

(10) Patent No.: US 7,459,003 B2
(45) Date of Patent: Dec. 2, 2008

(54) IN-LINE FILTER IN A DIFFUSION BONDED LAYERED SUBSTRATE

(75) Inventors: Mark Crockett, Foster City, CA (US); John W. Lane, San Jose, CA (US); Micahel DeChellis, Austin, TX (US); Chris Melcer, Sunnyvale, CA (US); Erica Porras, San Jose, CA (US); Aneesh Khullar, Sunnyvale, CA (US); Balarabe N. Mohammed, Union City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/542,829

(22) Filed: Oct. 3, 2006

(65) Prior Publication Data
US 2007/0051080 A1  Mar. 8, 2007

Related U.S. Application Data

(60) Division of application No. 10/617,950, filed on Jul. 12, 2003, which is a continuation-in-part of application No. 10/328,135, filed on Dec. 20, 2002, now Pat. No. 6,736,370.

(51) Int. Cl.
*B01D 46/00* (2006.01)

(52) U.S. Cl. .......................... 55/385.1; 55/417; 55/418; 55/419; 55/503; 55/523; 55/525; 55/495

(58) Field of Classification Search ........... 55/418–419, 55/503, 523, 525, 417, 385.1, 495; 210/198.2, 210/656, 510.1, 500.25, 505; 137/1, 803, 137/828, 833
See application file for complete search history.

(56) References Cited

U.S. PATENT DOCUMENTS

| | | | |
|---|---|---|---|
| 3,391,703 A | 7/1968 | Kay | 137/269 |
| 3,530,568 A | 9/1970 | Owczarski et al. | 228/194 |
| 3,664,887 A | 5/1972 | Atkiss | 148/6.16 |
| 3,698,963 A * | 10/1972 | Nunes et al. | 428/685 |

(Continued)

FOREIGN PATENT DOCUMENTS

DE  112821 B  6/1980

(Continued)

OTHER PUBLICATIONS

Website:: www.knovel.com.*

(Continued)

*Primary Examiner*—Duane S Smith
*Assistant Examiner*—Ives Wu
(74) *Attorney, Agent, or Firm*—Shirley L Church, Esq

(57) ABSTRACT

A space-conserving integrated fluid delivery system which is particularly useful for gas distribution in semiconductor processing equipment. The invention pertains to a diffusion bonded integrated fluid flow network architecture, which includes, in addition to a layered substrate containing fluid flow channels, an in-line filter and may include various fluid handling and monitoring components. The integrated fluid delivery system that is formed from a layered substrate is diffusion bonded, and the various fluid handling and monitoring components may be partially integrated or fully integrated into the substrate, depending on design and material requirements.

17 Claims, 18 Drawing Sheets

U.S. PATENT DOCUMENTS

| | | | |
|---|---|---|---|
| 4,570,675 A | 2/1986 | Fenwick et al. | 137/805 |
| 4,581,624 A | 4/1986 | O'Connor | 357/26 |
| 5,094,268 A | 3/1992 | Morel et al. | 137/560 |
| 5,226,578 A | 7/1993 | Douglas | 228/157 |
| 5,253,796 A | 10/1993 | Stacher et al. | 228/193 |
| 5,401,583 A | 3/1995 | Stacher et al. | 428/594 |
| 5,611,944 A | 3/1997 | Gilkinson et al. | 219/117.1 |
| 5,686,657 A | 11/1997 | Craig et al. | 73/23.42 |
| 5,755,428 A | 5/1998 | Ollivier | 251/331 |
| 5,859,107 A | 1/1999 | Jones et al. | 524/406 |
| 5,888,390 A * | 3/1999 | Craig | 210/198.2 |
| 6,046,056 A * | 4/2000 | Parce et al. | 204/403.05 |
| 6,062,246 A | 5/2000 | Tanaka et al. | 137/12 |
| 6,068,179 A | 5/2000 | Fowler | 228/157 |
| 6,221,235 B1 | 4/2001 | Gebhart | 205/654 |
| 6,251,779 B1 | 6/2001 | Lu et al. | 438/682 |
| 6,305,418 B1 | 10/2001 | Schulze | 137/625.23 |
| 6,357,760 B1 | 3/2002 | Doyle | 277/604 |
| 6,394,130 B1 | 5/2002 | Deininger | 137/596.12 |
| 6,499,499 B2 * | 12/2002 | Dantsker et al. | 137/1 |
| 6,612,153 B2 | 9/2003 | White et al. | 73/23.42 |
| 6,852,291 B1 | 2/2005 | Johnson et al. | 422/103 |
| 2001/0028049 A1 | 10/2001 | Mamyo | 251/63.5 |
| 2002/0003222 A1 | 1/2002 | Fukano et al. | 251/63.5 |
| 2002/0134445 A1 | 9/2002 | Eidsmore et al. | 137/884 |
| 2004/0126279 A1 * | 7/2004 | Renzi et al. | 422/100 |
| 2006/0273005 A1 * | 12/2006 | Love et al. | 210/510.1 |

FOREIGN PATENT DOCUMENTS

| | | | |
|---|---|---|---|
| DE | 19703169 | 7/1998 | |
| EP | 0918178 | 5/1999 | |
| EP | 0989605 | 3/2000 | |
| GB | 0743972 | 1/1956 | 99/1 |
| GB | 1279167 | 6/1972 | |
| GB | 1440968 | 6/1976 | |
| JP | 8075017 | 3/1996 | |
| JP | 11101352 | 4/1999 | |
| JP | 11194833 | 7/1999 | |
| WO | WO 01/14775 | 3/2001 | |
| WO | WO 01/54806 | 8/2001 | |

OTHER PUBLICATIONS

"Handbook of Materials Selection", Edited Myer Kutz, 2002.*

V.A. Bubnov, "Calculation of flow rate characteristics for controlling the hydraulic drive of a machine tool," Soviet Engineering Research, vol. 10, No. 11, pp. 90-96 (1990).

D. Robinson, et al., "Actuated Diaphragm Valves for Control Applications," Papers Presented at the International Conference on Developments in Valves & Actuators for Fluid Control, published by BHRA, Cranfield, England, pp. 97-117 (1985).

N. Sidell, et al., "The design and construction of a hight temperature linear electromagnetic actuator," Journal of Applied Physics, vol. 85, No. 8, @a, pp. 4901-4903 (Apr. 1999).

* cited by examiner

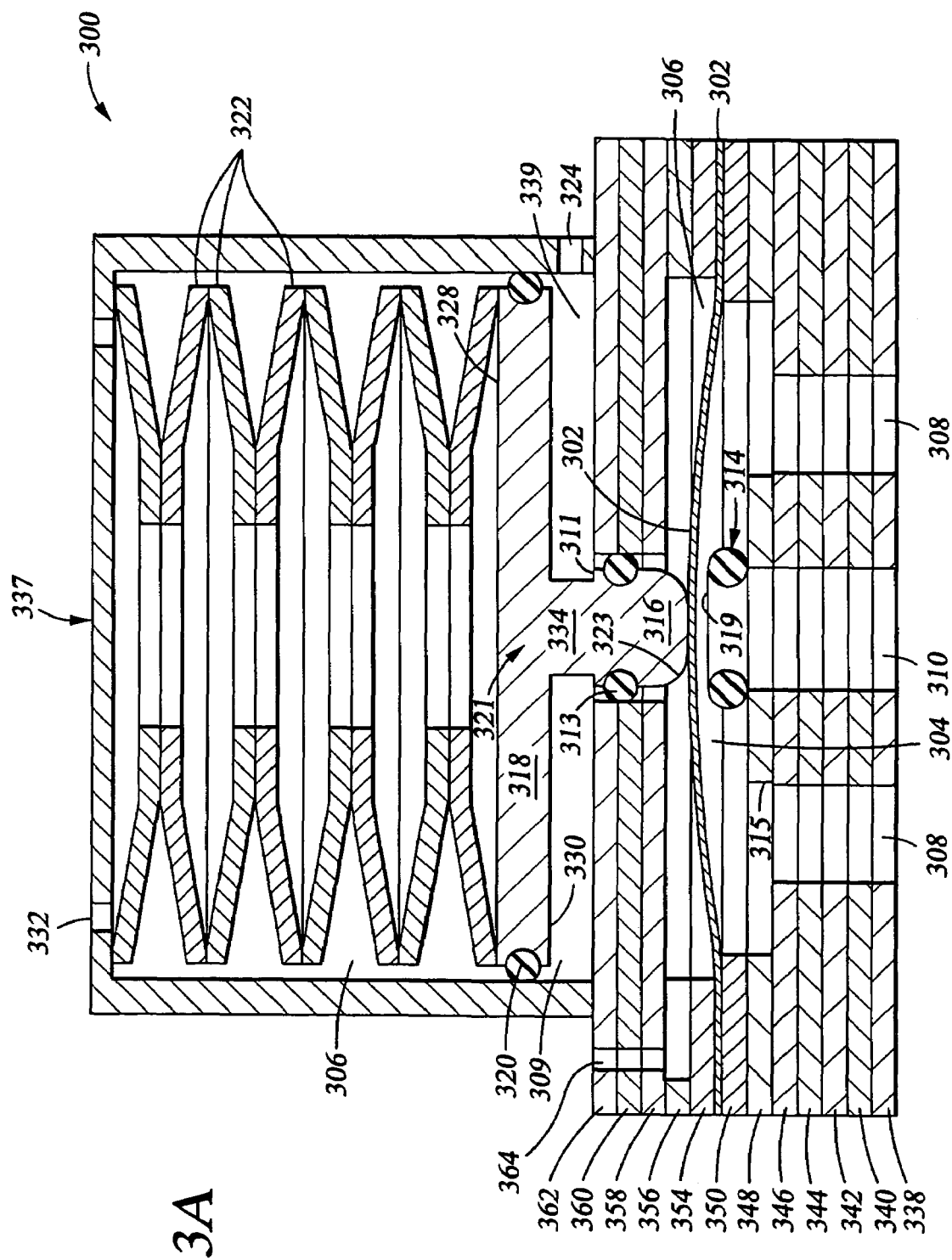

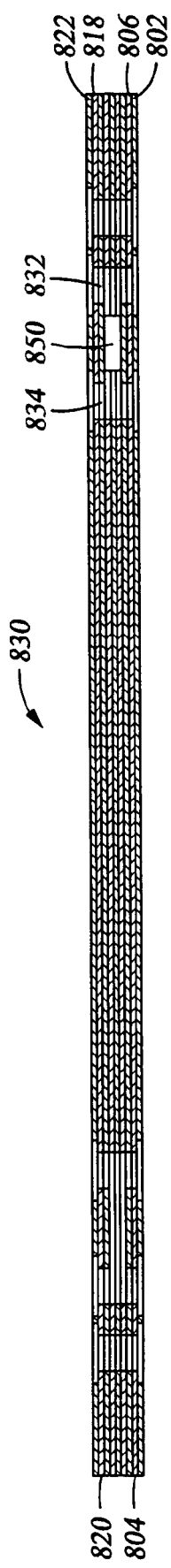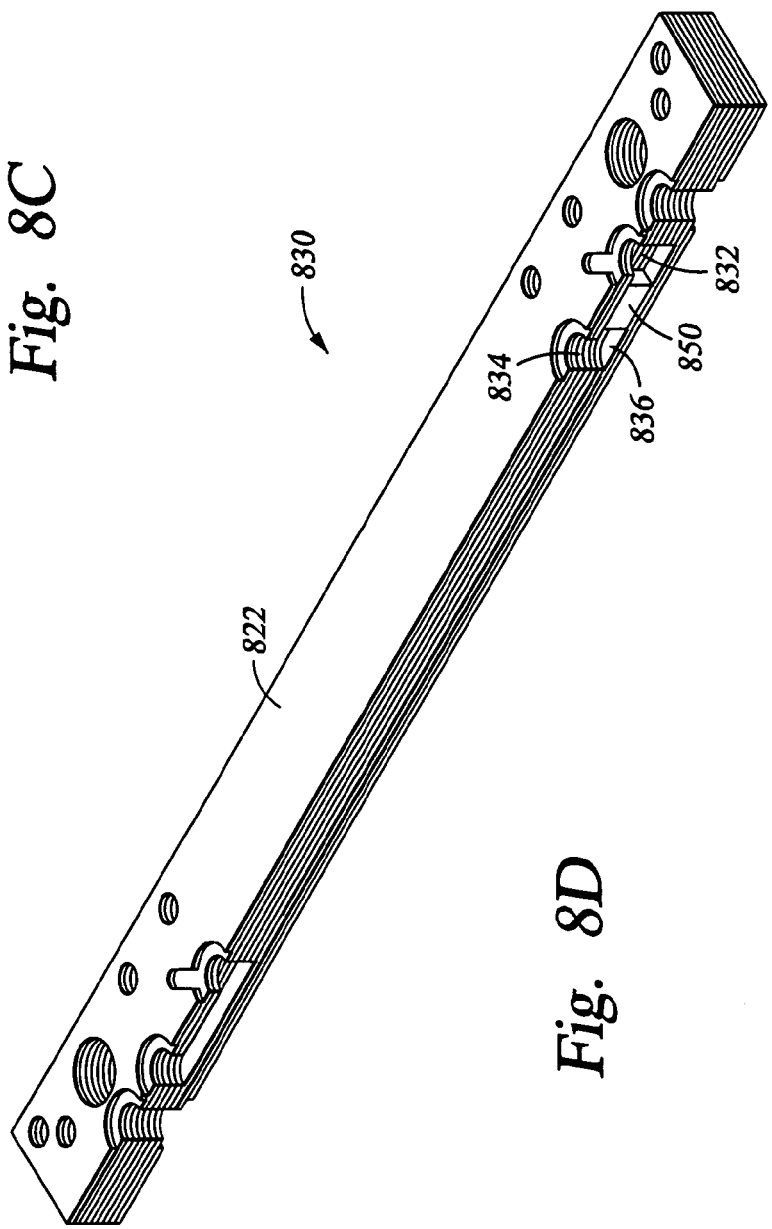
Fig. 8C
Fig. 8D

IN-LINE FILTER IN A DIFFUSION BONDED LAYERED SUBSTRATE

RELATED APPLICATIONS

This application is a Divisional of Application Ser. No. 10/617,950, filed Jul. 12, 2003, which is a continuation-in-part of U.S. application Ser. No. 10/328,135, filed Dec. 20, 2002, which issued as U.S. Pat. No. 6,736,370.

FIELD OF THE INVENTION

The present invention pertains to a space-conserving integrated fluid delivery system which is particularly useful for gas distribution in semiconductor processing equipment. The present invention also pertains to an on/off valve of compact design, adapted for allowing or preventing the flow of gases in semiconductor processing applications. It also pertains to other integrated fluid components, such as filters, pressure sensors, fluidic thermal sensors, laminar flow elements, pressure regulators, control valves, flow restrictors, and check valves, which may be integrated to different degrees into the structure of a fluid delivery network architecture.

BRIEF DESCRIPTION OF THE BACKGROUND ART

In chemical processing which relies on fluid handling in general, and particularly when the fluids to be handled are hazardous and reactive materials, improved system leak reliability and careful integration of the fluid handling devices and network architecture into the general process system is of paramount importance. In addition, it is important that all of the component devices used in the fluid handling be well integrated into the overall fluid flow network architecture to ensure system leak reliability, provide size reduction, and enable flexible control. In applications such as semiconductor processing, for example, the fluid component devices must also exhibit particular capabilities which ensure cleanliness of the fluid delivery process, so that the solid state devices being fabricated will not be contaminated, affecting performance and reliability.

One of the most widely used fluid component devices, which has been a source of particulate contamination in the past, is the on/off valve. The fluid on/off valve must exhibit several particular capabilities. First, it must allow and prevent fluid flow, including virtually absolute shutoff to as little as about $1 \times 10^{-9}$ cc/sec. of helium at a pressure differential of one atmosphere, as well as virtually zero outleakage (also $1 \times 10^{-9}$ cc/sec. helium at a pressure differential of one atmosphere). Helium is typically used for leak testing because of its small atomic size, diffusivity and high mobility. This is indicative of the ability to prevent exposure of the environment of often extremely toxic and corrosive process fluids. The fluid on/off valve must also maintain the required high purity of the fluids, contributing no appreciable amount of particulates, which are typically generated by wearing parts within the wetted portion of the valve. The fluid on/off valve must possess good resistance to the corrosive properties of the fluids. Due to the toxicity of a number of the fluids transported, very high system leak reliability and long service life (avoidance of the need to shut down and change out parts) are of great importance. Also of importance are a compact design, and a reasonable cost.

During work on the present conserved space integrated fluid delivery system, an on/off valve was designed which provides many of the advantages discussed above. In addition to the description of the integrated fluid delivery system, that on/off valve is described in detail herein.

The present invention takes the concepts regarding an integrated fluid flow system to a new level of integration which permits not only improved functionality, but also considerable cost savings in fabrication. As a result of the reduced fabrication cost, and a properly balanced level of modularity, it is possible to reduce maintenance costs for the fluid flow system by replacing integrated modules rather than shutting the system down for long maintenance and repair operations with respect to individual component devices (which are part of the integrated module in present designs).

The importance of very high system leak reliability and long service life (avoidance of the need to shut down and change out parts) in the semiconductor industry is illustrated by the factors which must be considered with respect to the design of an on/off valve. For example, in a fluid flow valve, each of the fluid-wetted parts must be fabricated from a highly corrosion-resistant material. In the general chemical processing industry, process control valves frequently employ corrosion-resistant plastic or elastomeric valve seats. Metal valve seats provide advantages in terms of minimizing valve seat maintenance and maintaining fluid cleanliness; however, metal valve seats require high seating forces, compared to polymeric seats, in order to reliably provide a tight shut-off. As a result, all valves with metal valve seats are typically larger in size and cost significantly more than valves with polymeric seats. Additional advantages of all-metal valves include their ability to be heated to high temperatures and their superior moisture dry-down characteristics.

One example of an advantageous valve having metal-to-metal seating for controlling the flow of a gas employs a flexible metal diaphragm mounted in the valve so the diaphragm can be moved into and out of sealing contact with the metal seat to close and open a gas passage, respectively. The valve seat has a rounded metal sealing projection with a relatively small cross-sectional radius around the seating section extending about the gas flow passage. The flexible metal diaphragm is moved into and out of sealing contact with the metal sealing projection of the seat by an actuator which employs a metal backing member which forcefully contacts the diaphragm during narrowing or closing of the gas flow passage. For additional information about this all-metal valve, one skilled in the art should refer to U.S. Pat. No. 5,755,428, of Louis Ollivier, issued May 26, 1988.

As described above, the potential problems of process fluid outleakage and/or process fluid attack on valve mechanicals may be addressed using a diaphragm valve having metal wetted parts (among other closing techniques). However, in previous designs, when the valve seat is metal, a particularly high seating force is required, compared with polymeric valve seats. Typically, when a plastic seat is used for a high cycle application, plastic deformation of the seat leads to lower valve reliability. The valve is typically operated in a normally-closed position, to provide a "fail safe" condition in the event of a loss of motive power (electric or pneumatic) to the actuator. When the actuator design incorporates a spring (or springs) capable of applying the large force required for a metal valve seat, the spring is typically large, on the order of 3 cm to 10 cm tall, and the valve itself is expensive, often costing around 5-6 times the price of a comparable capacity plastic-seated valve. It would be highly desirable to have a corrosion-resistant on/off valve, where all of the fluid-wetted parts are metal; where the valve is compact in design, and well integrated into its end use application.

With respect to an integrated network architecture of fluid flow devices and channels with an integrated control system, there is a constant need for a higher degree of integration, simplification and ease of operation. In addition to performance and handling advantages, the integrated fluid flow system must be cost competitive. This means that fabrication methods for the various fluid handling devices, interconnecting network architecture and integrated control system need to be easily scalable in tooling for mass production, variable production demand and cost-effective NRE (Non-recurring Engineering) charges. The present invention provides substantial advantages in all of these areas.

SUMMARY OF THE INVENTION

The present disclosure pertains to a space-conserving integrated fluid delivery system which is particularly useful for gas distribution in semiconductor processing equipment. The present invention is applicable to various integrated fluid handling devices, including filters, pressure sensors, fluidic thermal sensors, laminar flow elements, and an integrated on/off valve of compact design, adapted for precisely controlling the flow of gases in semiconductor processing applications. The integrated fluid delivery system and the integrated fluid handling devices such as the on/off valve employ layered substrate technology to varying degrees, depending on the device. In the layered substrate technology, fluid flow channels, portions of component device structures, and in some instances the complete component device structure are integrated into a fluid handling, interconnected network architecture. The fluid flow channels, are fabricated using patterned metal and metal alloy layers, which may be patterned by any method known in the art, but which are advantageously chemically or electrochemically etched and then adhered to each other to produce a layered substrate. One method which is advantageously used to adhere the patterned metal layers is diffusion bonding. Portions of component device structures and complete device structures are also fabricated using patterned metal and metal alloy layers which are adhered together, typically simultaneously with the fluid flow channels to form a fluid flow network. Diffusion bonding of partially integrated and fully integrated device structures into a layered substrate is described in detail herein.

One embodiment of an integrated on/off valve, as adapted for use in controlling process fluids in semiconductor processing operations (by way of example and not by way of limitation), is fabricated so that fluid-wetted surfaces of the valve are constructed from a corrosion-resistant metal or metal alloy, including a metallic diaphragm separating the wetted section of the valve from the non-wetted drive section of the valve. In the wetted section, process fluids enter through one or more entrance ports. The exit port from the wetted section comprises an annular metallic valve seat. The valve seat is formed as, or upon, an inner lip of the exit port. When the valve is closed, the fluid flow is interrupted by a section of the diaphragm being pressed tightly against the valve seat. Fluid may flow in either direction.

The metal valve seat is advantageously a dynamic seat which deforms elastically when pressed upon by the diaphragm and its backing disk, so that the seat recovers each time the valve is closed and reopened, rather than being permanently deformed by the valve's closure.

In the valve's wetted section, metal-to-metal bonding can advantageously be accomplished using diffusion bonding. Diffusion bonding is a direct bonding process which provides strong bonds that do not absorb or release process fluids, and do not contribute impurities to the process fluids, as a welded joint might do. It is important that no adhesive (or adhesive residue) be present on the wetted flow path. Diffusion bonding permits the formation of complex shapes without costly milling (machining).

In order for diffusion bonding to be most effective, the metal surfaces that are to be bonded must have an average surface roughness within the range of about 0.1 microinches Ra to about 30 microinches Ra maximum prior to diffusion bonding. Typically, the metal surfaces to be bonded have a surface roughness within the range of about 0.5 microinches Ra to about 10 microinches Ra maximum. We have found that diffusion bonding works quite well when the metal surfaces have a surface roughness within the range of about 1.5 microinches Ra to about 3.0 microinches Ra maximum.

In some cases, the metal surfaces will need to be pretreated by electropolishing or mechanical planarization to have the desired surface roughness prior to diffusion bonding. For example, stainless steel can be chemically or electrochemically etched using ferric chloride according to standard methodology known in the art. A process for electrochemical etching of difficult to etch materials such as HASTELLOY® is described in U.S. Pat. No. 6,221,235, issued Apr. 24, 2001, to Gebhart. Certain materials may require mechanical planarization to smooth down the surface prior to the performance of a chemical or electrochemical etching process to obtain a surface roughness within the desired range. Mechanical planarization of metal surfaces can be performed according to techniques known in the art.

In other instances, the metal surfaces may be manufactured with the desired surface roughness, and may need no electrochemical or mechanical pretreatment prior to diffusion bonding. For example, the ASTM standard for surface roughness for stainless steel sheets (as rolled) is 0.5 microinches Ra to 4.0 microinches Ra (ASTM 480 BA—bright annealed). No electropolishing is needed for this material prior to diffusion bonding. However, after diffusion bonding, it is necessary to treat the steel surfaces which will be in contact with corrosive materials to improve the corrosion resistance of such steel surfaces.

In the valve's non-wetted drive section, a sliding cylinder moves up and down, pressing a lower horizontal member, which typically includes a convex contacting surface, against a diaphragm, which is in turn pressed against the valve seat to close the valve. The diaphragm is permitted to move away from the valve seat to open the valve. The sliding cylinder has an upper horizontal member connected to a smaller, lower horizontal member by a vertical member. The sliding cylinder may be of single piece construction. The valve is maintained in a normally-closed position by a spring force applied at the top of the upper horizontal member of the sliding cylinder. The spring drives the lower horizontal member of the sliding cylinder, which includes a convex surface (acting as a backing disk), against the diaphragm. The sliding cylinder has a gas-tight seal around the perimeter of both the upper horizontal member and the lower horizontal member. A typical gas-tight seal is a polymeric "O"-ring. The valve is opened by pneumatic force from a pressurizing gas which is applied in a space between the upper horizontal member and the lower horizontal member of the sliding cylinder. When the pressurizing gas is applied within the space, the pressurizing gas acts to compress a spring or spring assembly located above the upper horizontal member, permitting the sliding cylinder to rise, and permitting the diaphragm beneath the lower horizontal member to rise above the metallic seat, enabling fluid to flow through the annular opening within the metallic seat.

The use of Belleville springs to provide the closing force permits a much more compact valve actuator than the use of coil springs.

In the drive section of the valve which is not wetted by fluids, metal-to-metal bonding may be advantageously accomplished using high-strength adhesives, which do not require subjecting valve mechanicals to the increased temperatures and pressures involved in performing the diffusion bonding used in the wetted section, and which provide a simpler, lower cost, albeit less corrosion/erosion resistant, alternative to diffusion bonding.

The chemical or electrochemical etching and diffusion bonding techniques described above with reference to the manufacture of the wetted section of an on/off valve may be used in the preparation of an entire integrated fluid delivery network architecture for use in corrosive environments, such as those in semiconductor processing. The integrated fluid delivery network architecture includes an assembly employing at least one gas distribution channel, where the assembly comprises a structure which employs a plurality (i.e., at least two) of metal layers which have been diffusion bonded together. The metal layers are typically selected from the group consisting of stainless steel (typically, 400 series stainless steel), HASTELLOY® (typically, HASTELLOY® C-22), ELGILOY®, and combinations thereof. Each of the metal layers typically has a thickness within the range of about 0.0005 inch to about 0.06 inch; more typically, about 0.002 inch to about 0.05 inch; most typically, about 0.025 inch.

A metal layer typically includes a series of through-holes, so that, when the layers are stacked in a particular manner, an aligned combination of the through-holes provides specific desired internal shapes within the stack. The internal shapes include channels or other functional device structures. The through-holes are typically round or oblong in shape, so that there are no sharp corners which can wear and produce particulates during operation of the fluid delivery system. The metal layers are advantageously etched using chemical etching, electrochemical etching, or a combination thereof, to provide the through-holes prior to a diffusion bonding process in which the layers are bonded together to become a functional fluid handling network architecture. The use of chemical, and advantageously, electrochemical etching tends to provide a smoother surface on a through-hole, which aids in reduction of sources of particulate contamination from the fluid handling network architecture. In some instances, depending on the surface condition of the metal layer prior to through-hole etching, the chemical or electrochemical etching process also reduces the roughness of the surfaces which are to be bonded during the diffusion bonding process, enabling better diffusion bonding.

Various component devices, such as laminar flow devices, mass flow controllers or flow sensing devices, flow restrictors, on/off valves, check valves, filters, pressure regulators, and pressure sensors (for example and not by way of limitation), may be incorporated at least in part into the layered structures described above. In some instances a portion of a component device may be surface mounted on the fluid handling network architecture, when it is not practical to include elements of the device in the multilayered structure.

It is advantageous to integrate various component devices into a multi-layered, structure by incorporating at least a portion of the component device within the stack of metal layers prior to bonding. Components that are well suited for incorporation into a diffusion bonded multi-layered structure include filters, pressure sensors, and valves, by way of example and not by way of limitation.

One embodiment of a gas distribution assembly which makes use of multi-layered, diffusion bonded elements is fabricated by a method which includes the following steps: providing a plurality of metal layers; etching at least one feature in more than one of the metal layers (where in some instances not all of the layers need be etched); aligning the plurality of metal layers; and diffusion bonding the plurality of metal layers. Typically the etching is electrochemical etching which provides advantages in terms of surface finish of the etched metal layer.

With respect to the diffusion bonding of corrosion-resistant metal layers, when each of the metal layers is a 400 series stainless steel, or a majority of the metal layers are 400 series stainless steel in combination with layers of material which bond at a lower diffusion bonding temperature, diffusion bonding is typically performed at a temperature within the range of about 1000° C. to about 1300° C., at a pressure within the range of about 3000 psi to about 5000 psi, for a time period within the range of about 3 hours to about 6 hours. When each of the metal layers is HASTELLOY® C-22, or a majority of the metal layers are HASTELLOY® C-22 in combination with layers of material which bond at a lower diffusion bonding temperature, diffusion bonding is typically performed at a temperature within the range of about 1000° C. to about 1300° C., at a pressure within the range of about 8000 psi to about 10,000 psi, for a time period within the range of about 3 hours to about 6 hours. When a combination of 400 series stainless steel layers and HASTELLOY® C-22 layers are diffusion bonded, diffusion bonding is performed at a temperature within the range of about 1000° C. to about 1300° C., at a pressure within the range of about 4000 psi to about 10,000 psi, for a time period within the range of about 3 hours to about 6 hours. When a combination of 400 series stainless steel layers and ELGILOY® layers are diffusion bonded, diffusion bonding is performed at a temperature within the range of about 1000° C. to about 1300° C., at a pressure within the range of about 4000 psi to about 10,000 psi, for a time period within the range of about 3 hours to about 6 hours.

It is also possible to attach a semiconductor processing chamber component to a semiconductor processing chamber using a diffusion bonding process. The semiconductor processing chamber component may be a gas distribution network architecture, or may be a component device selected from the group consisting of manually operated valves, automatic valves, pressure and temperature sensors, flow controllers, filters, pressure regulators, check valves, metering valves, needle valves, and purifiers, for example, and not by way of limitation. The semiconductor processing chamber to which the component is bonded is typically an etch chamber, a chemical vapor deposition (CVD) chamber, or a physical vapor deposition (PVD) chamber, by way of example and not by way of limitation. The particular diffusion bonding process which is used will depend on the materials of construction of the chamber and the chamber component as well as the shape of and accessability of the surface areas to be bonded.

Also disclosed herein is a method of increasing the etchability of metals which have a microstructure which is resistant to chemical etching (such as HASTELLOY C-22). This is accomplished by temporarily removing the microstructure which provides corrosion resistance to the metal. The microstructure is removed from the metal by heating the metal to a temperature within the range of about 1800° F. to about 2000° F. for a period of at least a few minutes. The heat-treated metal can be more easily chemically etched than prior to heat treatment. Following chemical etching, the microstructure must be returned to the metal in order for the metal to regain its original corrosion resistance. This is accomplished by heating the metal to a temperature greater than about 2100° F. for at least about 30 minutes, followed by rapid cooling of the metal to a temperature of less than about 300 F, within a time period of about 5 minutes. The second heat treatment step can be performed concurrently with diffusion bonding of two or more layers of the metal. The above method is particularly useful for treatment of corrosion-resistant metal alloys which contain between about 43 to about 71 weight % nickel, and between about 1 to about 30 weight % chromium, by way of example and not by way of limitation.

BRIEF DESCRIPTION OF THE DRAWINGS

FIG. 3A is a schematic diagram of a cross-sectional view of an embodiment of an on/off valve 300 which was fabricated using diffusion bonding.

FIG. 8C is a schematic showing the cross-sectional view A-A of layered structure 830 including a fully integrated particulates in-line filter 850.

FIG. 8D is a schematic showing a more three-dimensional three quarter view of layered structure 830 and illustrating the inlet 832 and outlet 834 for in-line filter 850.

DETAILED DESCRIPTION OF THE INVENTION

As a preface to the detailed description, it should be noted that, as used in this specification and the appended claims, the singular forms "a", "an", and "the" include plural referents, unless the context clearly dictates otherwise. When the term metal or metallic is used, it is understood that this includes metal alloys. Other terms important to an understanding of the invention are defined in context throughout the application.

Figure 1:
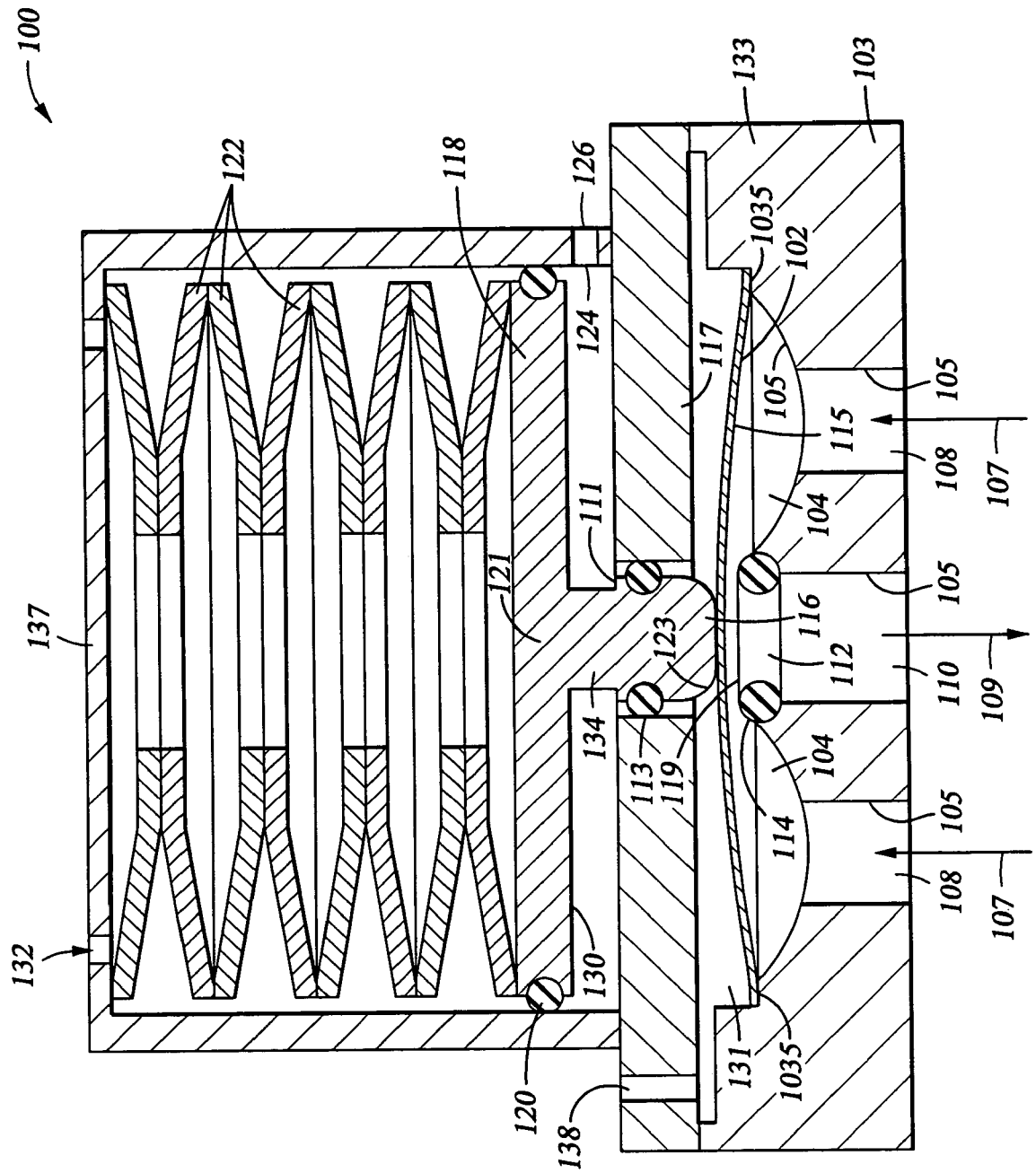
FIG. 1 is a schematic diagram of a cross-sectional view of one embodiment of the inventive on/off valve.
Figure 2:
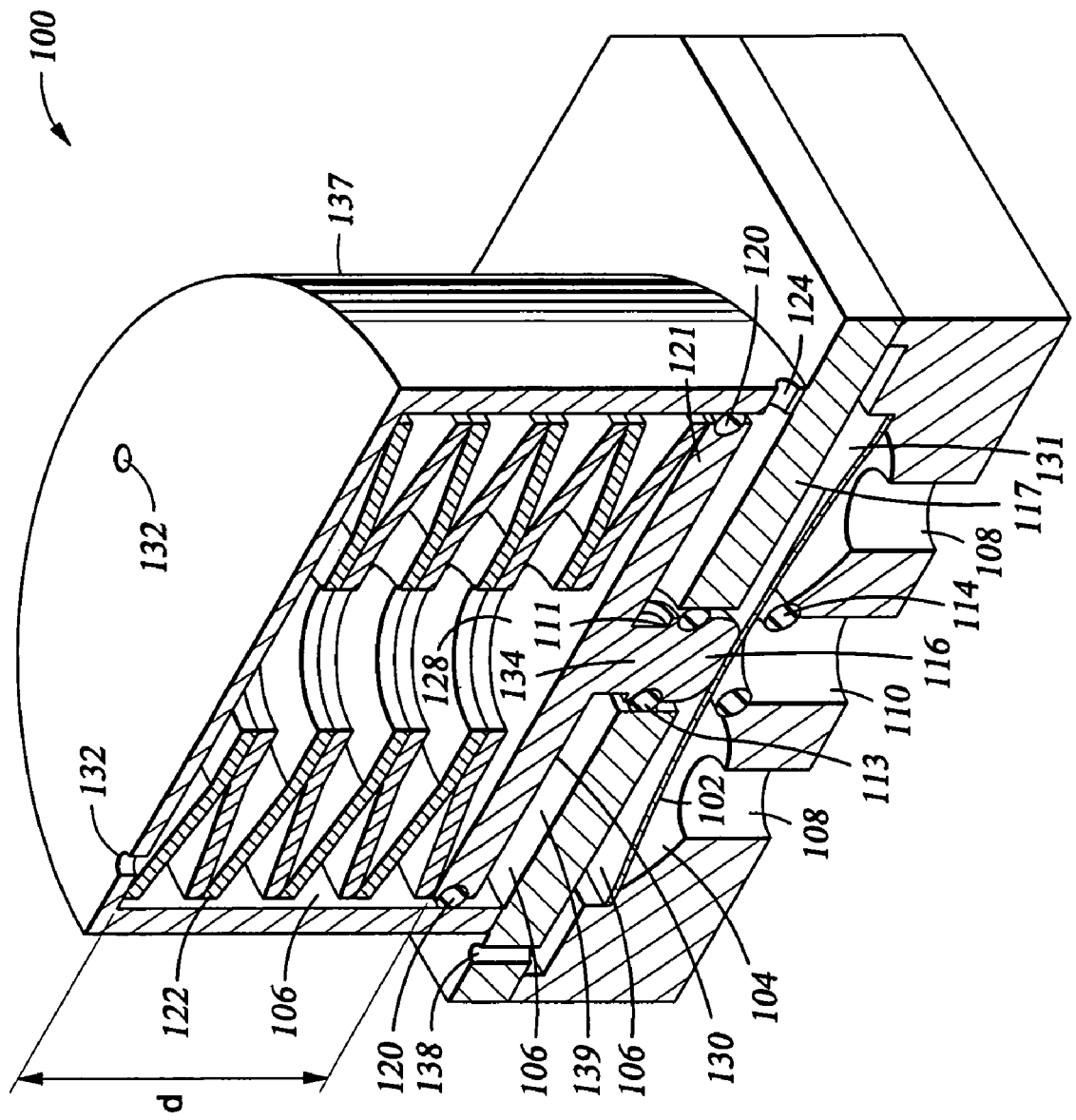
FIG. 2 is a schematic diagram of a three-dimensional side view of the embodiment on/off valve 100 shown in FIG. 1.

For purposes of illustration, the first embodiment of a layered structure concept will be described with respect to the design of compact fluid on/off valve where a portion of the compact fluid on/off valve is integrated into a fluid handling network architecture. FIGS. 1 and 2 illustrate one embodiment of a valve 100 which incorporates a number of inventive features. In FIGS. 1 and 2, all of the valve parts which contact (are wetted by) fluid flowing through the valve are metallic. In particular, parts 102, 103, and 114 are wetted parts. Typically, the metallic material is highly corrosion-resistant. Valve 100 includes a metal diaphragm 102 separating the wetted section 104 of the valve 100 from the drive section 106 of the valve 100. The metal diaphragm 102 provides a seal against metal valve seat 114 when the valve 100 is in its normally-closed position. Once a fluid, illustrated by arrow 107, has entered through entrance port 108, lower surface 115 of diaphragm 102 is in contact with the fluid, both when valve 100 is open or closed. It is advantageous to use a corrosion-resistant material on surface 115 of diaphragm 102. The diaphragm 102, in addition to being highly corrosion-resistant, must also have good flexure characteristics if it is to survive long periods of numerous open-close cycles. To ensure that there will be no leakage into the environment, leakage of process gas from the wetted section 104 of the valve 100 into the drive section 106 of the valve 100 must be $1 \times 10^{-9}$ cc/sec or less (SEMI F1 standard) for at least 15 seconds, at a pressure difference of 1 atm He across the valve sealing interface 103S. With respect to chamber 131, which is the low pressure, atmospheric side of the diaphragm 102, this chamber is typically vented to atmosphere by a diaphragm top side vent 138, so that pressure cannot build up.

The metal diaphragm 102 can advantageously be fabricated of a nickel-cobalt alloy, such as ELGILOY®, SPRON™ 510 (available from Seiko Electron), SPRON™ 100, HASTELLOY®, or INCONEL®. The diaphragm can be either a single thickness or a laminate. In many cases, the diaphragm will be multi-layered, with two to three diaphragms layered (not necessarily bonded) together. Multi-layered diaphragms provide a better seal and add springiness. An individual diaphragm will typically have a thickness within the range of about 0.001 to about 0.007 inch (0.1 mil to 7 mil). The individual diaphragms within a multi-layered diaphragm will typically (but not necessarily) be of the same material. Alternatively, instead of using a multi-layered diaphragm, an individual diaphragm that has been machined to be of variable thickness may be used.

The diaphragm 102 is held in place by its edge which is adhered to a surface 103s of wetted body section 103 so that diaphragm 102 is retained between the lower wetted body section 103 and the non-wetted drive body section 117. The joint between the diaphragm 102 and the wetted body section 103 is typically a diffusion bonded joint. Alternatively, the joint may be bonded using laser welding. However, diffusion bonding typically provides a stronger and more reliable bond.

The lower body section 103 of valve 100 includes surfaces 105 which are wetted by fluids passing through the valve 100. Typically, it is advantageous to form lower body section 103 from a corrosion-resistant metal or metal alloy, such as 400 series stainless steel, HASTELLOY C-22® (a registered trademark of Haynes International, Inc. of Kokomo, Ind.), INCONEL® (a registered trademark of the Special Materials Metal Corp., a group of companies, having offices in New Hartford, N.Y.), and ELGILOY™ (a registered trademark of Elgiloy Specialty Metals, Elgin, Ill.). These same materials may be used to fabricate diaphragm 102. As previously mentioned, diaphragm 102 must be somewhat flexible, the thickness of the diaphragm typically ranges from about 0.025 mm to about 0.18 mm; and, in the embodiments described herein, the diaphragm was about 0.1 mm thick.

The drive section 106 of valve 100 may be fabricated of these same materials, or may be fabricated from less expensive materials which are not as corrosion-resistant, since the surfaces of components of drive section 106 are not wetted by fluids which flow through the valve 100. By way of example, housing 137 and sliding cylinder 121 may be fabricated from aluminum and stainless steel. However, the cone disk springs 122 are typically made from high carbon steel, such as ASTM A510.

The various parts of the valve will now be described, with respect to FIGS. 1 and 2, in terms of their function during operation of the valve.

The process fluid (or fluids), indicated by arrows 107, enter through an entrance port 108 (ports 108) present within lower body section 103 of the valve 100. In doing so, the process fluid contacts surfaces 105 of lower body section 103 within wetted section 104. When the valve 100 is in an open or partially-open position, permitting fluid to flow through the valve 100, exiting fluid, illustrated by arrow 109, will flow out of exit port 110, over inner lip 112 of annular metallic valve seat 114.

The sliding cylinder 121 has an upper horizontal member 118 connected to a smaller lower horizontal member 116 by a vertical member 134. When the valve 100 is in the closed position, the fluid flow is interrupted by a section of the diaphragm 102 being pressed tightly against an upper surface 119 of the metal valve seat 114 by lower horizontal member 116 of sliding cylinder 121. The lower surface 123 of lower horizontal member 116 is convex-shaped, so that it can act as a backing disk behind diaphragm 102. Lower horizontal member 116 is considered to be part of drive section 106, since lower horizontal member 116 is not wetted by fluids passing through valve 100. The diaphragm 102 may be free-moving, or may be bonded to the convex surface 123 of lower horizontal member 116, for example, by e-beam welding, or direct bonding, or other bonding techniques known in the art. The convex surface 123 of lower horizontal member 116 which contacts diaphragm 102 is typically made of a material which has a hardness less than that of the diaphragm material. If the diaphragm 102 is made of a nickel-cobalt alloy (for example, and not by way of limitation, ELGILOY®, SPRON™ 510, SPRON™ 100, HASTELLOY®, or INCONEL®, the convex surface 123 may be made of 304 stainless steel, by way of example, and not by way of limitation.

The metallic valve seat 114 is formed as part of, or upon, the inner lip 112 of the exit port 110. Depending upon its design, the metal valve seat 114 may be advantageously fabricated from metal or a metal alloy, such as, for example and not by way of limitation, stainless steel, ELGILOY®, SPRON™ 100, or SPRON™ 510. Most typically, the metallic valve seat 114 is fabricated from 400 series stainless steel. Metallic valve seat 114 may be, for example, any of the commercially available C-seals, such as, by way of example and not by way of limitation, the MICROSEAL® ring seal available from Microflex Technologies LLC., which is shown in FIG. 4 and described in detail in U.S. Pat. No. 6,357,760, issued Mar. 19, 2002, to Doyle. Because of its particular geometry, the MICROSEAL® ring seal typically has a better elastic range than many other commercially available seals, providing a flexibility which is desirable for use in a valve seat of the present invention.

Figure 4A:
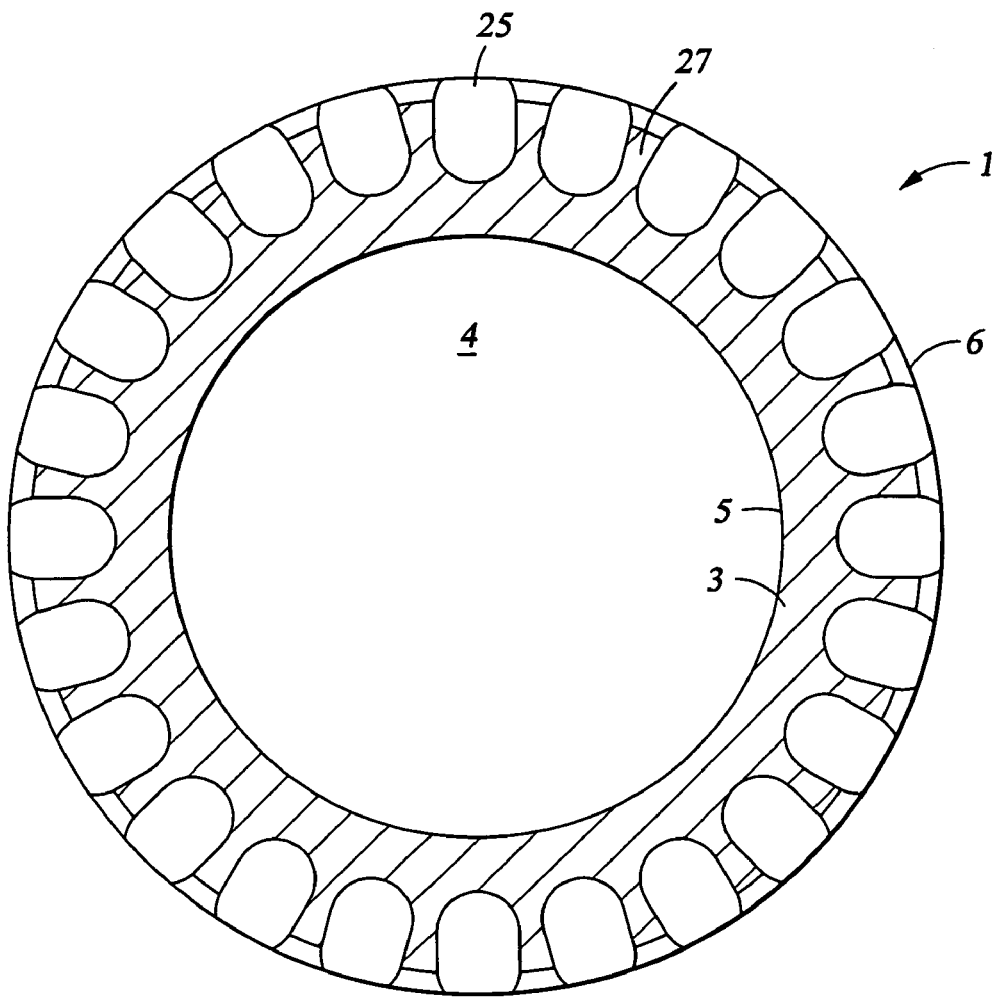
FIG. 4A is an enlarged view of one embodiment of a ring seal, which can be used as a metallic valve seat in an embodiment of a control valve of the present invention.
Figure 4B:
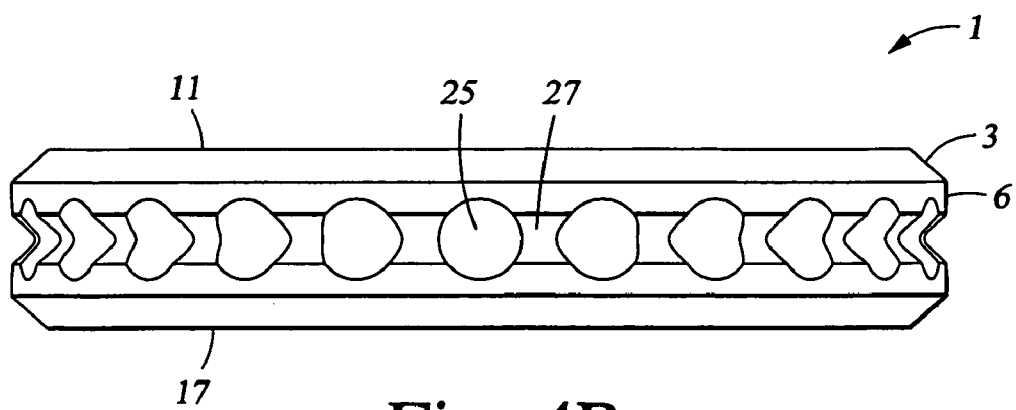
FIG. 4B is a side view of the ring seal shown in FIG. 4A.

With reference to FIG. 4A, the ring seal shown, which is useful as a valve seat in the present inventive valve, has an annular shaped body element 3, with an axial aligned center hole 4 for permitting the passage of gases or fluids therethrough. The seal includes a radial inner surface 5, a radial outer surface 6, a first axial surface 11, and a second axial surface 17, as shown in FIG. 4B. Each of these surfaces may take any number of configurations.

The ring seal shown in FIGS. 4A and 4B further includes a plurality of bores 25 which project inwardly from the seal's radial outer surface 6 toward the seal's center hole 4. The non-axially aligned sidewalls 27 which form bores 25 are believed to be particularly suited where the application for the seal requires significant deformation for a particular load, and this kind of ring seal performs very well in the valve of the present invention. Other ring-shaped seals may also be used, and it is not intended that the valve design be limited to one employing the particular ring seal described above.

In addition to its high corrosion resistance, the metallic valve seat 114 has the property of being a dynamic seat. The seat is designed, and its material or materials of construction selected, to deform sufficiently to seal off the exit port 110 to the required level of cross-seat leakage, when pressed upon by the diaphragm 102. When valve 100 is in the normally-closed position, it is required that the cross-seat leakage level is no more than about $1 \times 10^{-9}$ cc/sec or less (SEMI F1 standard) for at least 15 seconds, at a pressure difference of 1 atm He across the valve diaphragm/seat interface. Preferably, the metallic seat 114 deformation remains in the elastic regime, so that the metallic seat 114 recovers each time the valve 100 is closed and reopened, rather than being permanently deformed by the valve's closure. It is anticipated that this feature will greatly increase the valve's reliability and useful lifetime.

Bonding of the valve 100 non-wetted drive body section 117 to the lower wetted body section 103, and bonding of a metallic valve seat 114 to an inner lip 112 of an annular metallic valve seat 114, may be advantageously accomplished by diffusion bonding. Diffusion bonding is a direct bonding process which provides smooth, strong bonds that do not absorb or release process fluids, and do not contribute impurities to the process fluids, as a welded joint might do. A process for diffusion bonding two metallic components involves finishing their mating faces to a very clean, smooth, and flat surface finish, then applying pressure and heating the components until the atoms of the respective surfaces interdiffuse, forming an interlocked layer, without liquefying either of the surfaces or introducing any voids, pits, or inclusions. Another process such as laser welding may be used when a two-step diffusion bonding process is used to fabricate body section 103.

In order for diffusion bonding to be effective, the metal surfaces that are to be bonded must have a surface roughness within the range of about 0.5 microinches Ra to about 30 microinches Ra prior to diffusion bonding. Typically, the metal surfaces have a surface roughness within the range of about 0.5 microinches Ra to about 10 microinches Ra; more typically, within the range of about 1.5 microinches Ra to about 5 microinches Ra. We have found that diffusion bonding works quite well when the metal surfaces have a surface roughness within the range of about 1.5 microinches Ra to about 3.0 microinches Ra.

In many cases, the metal surfaces will need to be pretreated by chemical etching, or a combination of mechanical planarization and chemical etching, to have the desired surface roughness prior to diffusion bonding. For example, stainless steel can be chemically etched using ferric chloride according to standard methodology known in the art. A process for electrochemical etching of difficult to etch materials such as HASTELLOY is described in U.S. Pat. No. 6,221,235, issued Apr. 24, 2001, to Gebhart.

Certain materials may require mechanical planarization to smooth down the surface prior to the performance of a chemical etching process to obtain a surface roughness within the desired range. Mechanical planarization of metal surfaces can be performed according to techniques known in the art.

In some instances, the metal surfaces may be manufactured with the desired surface roughness, and may need no chemical or mechanical pretreatment prior to diffusion bonding. For example, the ASTM standard for surface roughness for stainless steel sheets (as rolled) is 0.5 Ra to 4.0 Ra (ASTM 480 BA).

Once the metal surfaces to be bonded have been polished to the desired surface roughness, diffusion bonding is performed. The particular pressure applied during the diffusion bonding process, and the particular temperature at which the diffusion bonding process is performed, will depend on the materials being bonded. Some typical conditions for forming a successful diffusion bond between similar or dissimilar metal surfaces of the sort that have been discussed above are shown in Table One, below:

TABLE ONE

Conditions for Diffusion Bonding of Various Metals

| Materials being Bonded | Temperature | Pressure | Contact Time |
|---|---|---|---|
| 316L Stainless Steel to 316L Stainless | 1000-1300° C. | 3000-5000 psi | 3-6 hours |
| 410 Stainless Steel to 410 Stainless | 1000-1300° C. | 3000-5000 psi | 3-6 hours |
| HASTELLOY ® C-22 to HASTELLOY C-23 | 1000-1300° C. | 8000-10,000 psi | 3-6 hours |
| 400 series Stainless Steel to HASTELLOY ® C22 | 1000-1300° C. | 4000-10,000 psi | 3-6 hours |
| 400 series Stainless Steel to ELGILOY ® | 1000-1300° C. | 4000-10,000 psi | 3-6 hours |

Figure 3B:
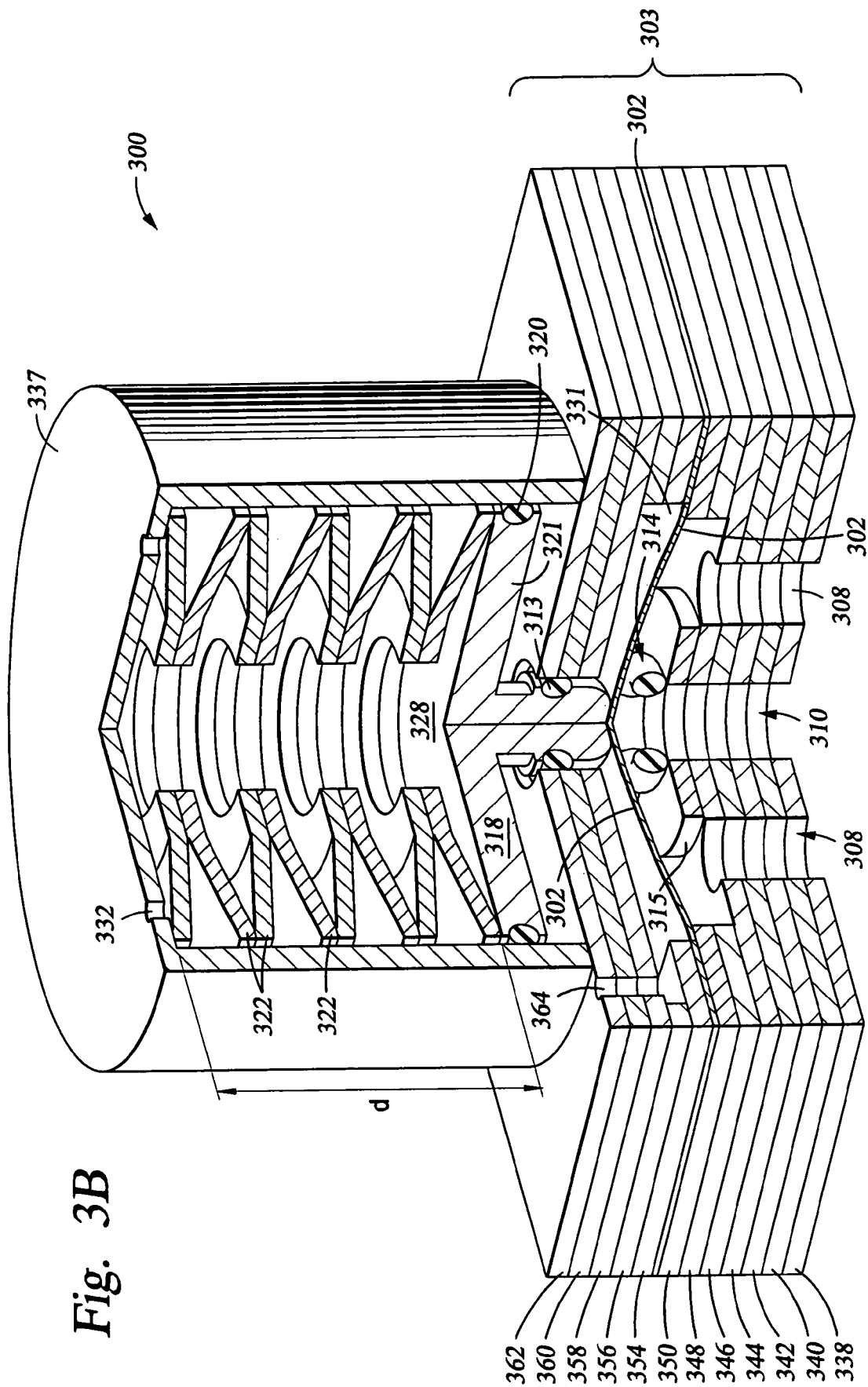
FIG. 3B is a schematic ¾, three-dimensional view of the valve shown in FIG. 3A.

Pressures and temperatures in the ranges shown above would certainly prove deleterious to some materials present in the drive section 106 of the valve, and this must be taken into consideration in the planning of assembly for valve 300 of the kind shown in FIGS. 3A and 3B. For example, in the manufacture of valve 300, a high temperature diffusion bonding process can be run first, to bond layers 338-356 shown in FIGS. 3A and 3B (layers 358, 360, and 362 were adhesive bonded). Since the layers such as 340, and 342, for example, are typically about 0.025 inches (about 0.0635 mm) thick, patterns can be wet chemically or electrochemically etched using techniques known in the art, to produce patterned sheet materials for diffusion bonding into valve structures. The chemical or electrochemical etching provides smooth surfaces in the patterned areas, which smooth surfaces appear on the internal wetted valve structure surfaces. This reduces the possibility of contamination of fluids flowing through the valve. Use of a 0.025 inch thick metal layer is advantageous because this thickness of metal layer is readily available from suppliers; provides reasonable pattern etching times; and is of adequate thickness to accommodate a C-seal in a counterbore of the type used for surface mount of component devices. The assembled, bonded structure may employ complex shapes without the need for complicated and costly machining. Other components (such as the sliding cylinder 321, sliding seals 313 and 320, and/or metallic seat 314) may be adhered/bonded afterward. The piston portion 316 of sliding cylinder 321 can be lifted out prior to diffusion bonding, which is carried out before assembly.

Figure 3C:
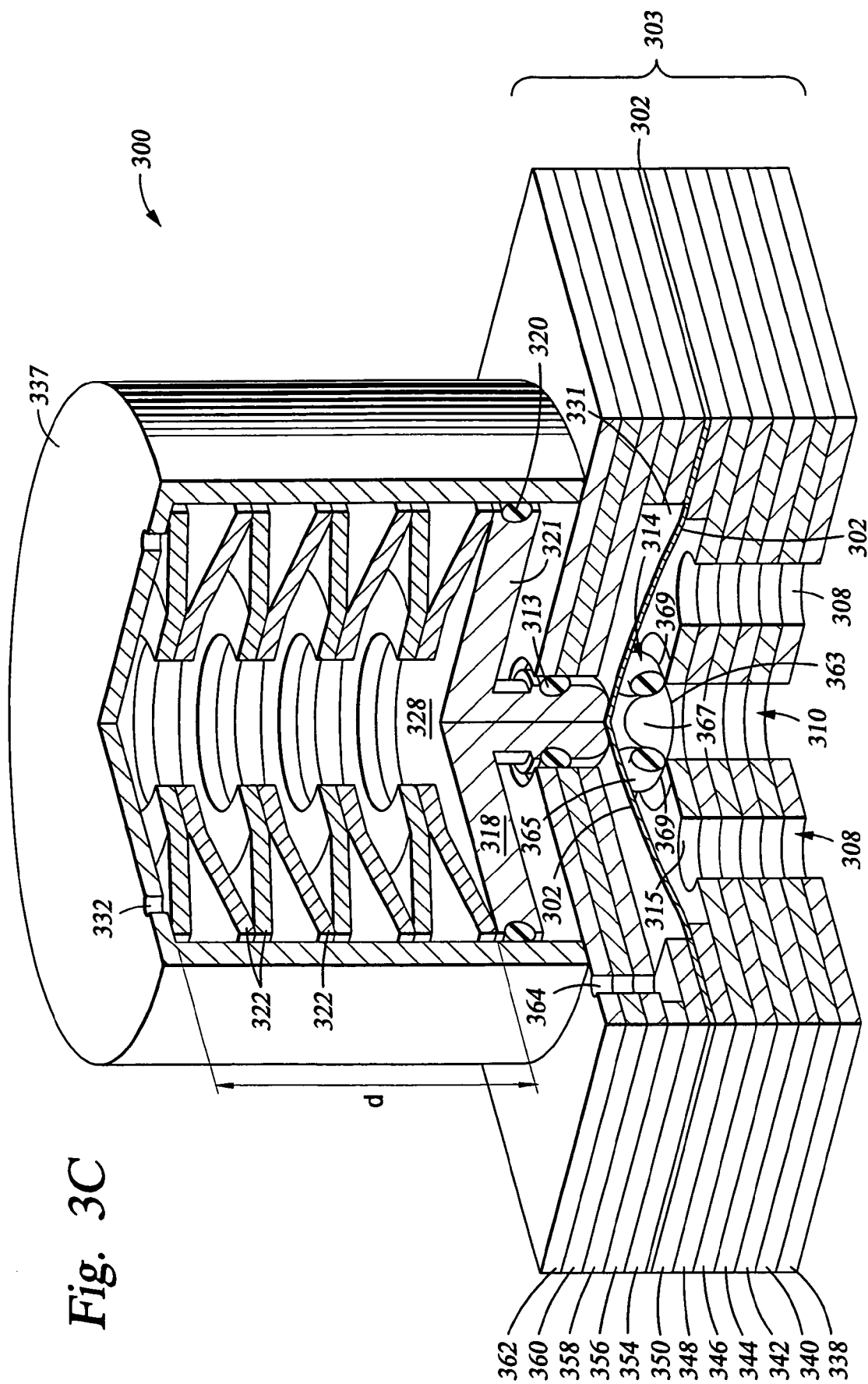
FIG. 3C is the schematic view FIG. 3B valve, which also shows a temporary rigid, but dissolvable support 363 which is used to hold seat 314 away from diaphragm 302 and underlying layer 348 during diffusion bonding of lower section 303 of the on/off valve 300.

Metallic seat 314 can be bonded to layer 348 by two different techniques. With reference to FIG. 3B, in the first technique, a first assembly of layers including layers 338, 340, 342, 344, 346, and 348 may be diffusion bonded. Then, prior to assembly with the other layers in the layered substrate 303, metallic seat 314 may be bonded to layer 348 either by laser welding or by diffusion bonding. A second assembly of layers, 350, 302, 354, and 356 may be diffusion bonded together. Then, the first assembly of layers may be diffusion bonded to the second assembly of layers. This technique makes it possible to diffusion bond the layered substrate 303 while avoiding placing undue pressure on metallic seat 314. In a second technique for bonding metallic seat 314, with reference to FIG. 3C, a rigid, but dissolvable support 363 may be used to enable the diffusion bonding in a single step. The dissolvable support 363 includes a central domed section 367, which holds diaphragm 302 away from the upper surface 365 of support 363 during the diffusion bonding process. In addition, rigid dissolvable support 363 includes a cup-shaped lip 369 which underlies the lower surface of metallic seat 314. After bonding of layered substrate 303, the rigid dissolvable support 363 is dissolved in an appropriate solution. The rigid dissolvable support must be capable of withstanding the temperature experienced by the substrate during diffusion bonding and must be capable of dissolution without leaving behind particulate residue which affects the ability of the valve to perform reliably. The interior space beneath diaphragm 302 may optionally be cleaned with a cleaning solution to remove any residues from the upper surface of layer 348 which remain after the step in which the dissolvable support 363 is removed. The interior open surfaces of layered substrate 303 may be blown dry using nitrogen or another inert gas, and may be dried using heat and vacuum if desired, depending on the dissolving solution and/or cleaning solution used. The metallic seat 314 is then bonded to layer 348 through port 310.

Diffusion bonding techniques (such as described above) can be used in the manufacture of other gas handling elements, such as flow rate controllers, filters, and sensors, for example and not by way of limitation. This will be illustrated in detail with respect to the layered substrate technology described subsequently.

In the valve's drive section 306, above the diaphragm which isolates the wetted section 304, the sliding cylinder 321 moves in and out, such that the convex surface 323 of lower horizontal member 316 of sliding cylinder 321 presses against diaphragm 302 to restrict the flow of fluids within wetted section 304. Chamber 331, which is the low pressure, atmospheric side of the diaphragm 302, this chamber is typically vented to atmosphere by a diaphragm top side vent 364, so that pressure cannot build up. The motion of sliding cylinder 321 is achieved by balancing the force applied to upper horizontal member 318 (which is tied by vertical member 334 to lower horizontal member 316) by a spring 322 positioned within housing 337, and the force applied to lower horizontal member 316 by a fluid present in a pneumatic chamber 339. The sliding cylinder 321 has a gas-tight sliding seal (typically an "O-Ring") 320 around the perimeter of upper horizontal member 318, and a gas-tight sliding seal 313 around the perimeter of lower horizontal member 316. Since the sliding seals do not contact fluids passing through valve 300, they need not be metal, and may comprise a polymeric material. The sliding seals (O-rings) 320 and 313 are typically fabricated from an elastomeric material.

The valve 300 is maintained in a normally-closed position by force applied by spring 322 upon upper horizontal member 318 of sliding cylinder 321. When the valve seat 314 is metallic, the seating force required for absolute shutoff (a fluid flow of less than $1 \times 10^{-9}$ cc/sec for at least 15 seconds, at a pressure difference of 1 atm He across the valve) is in the range of 1000 N/cm$^2$ at the sealing contact surface 319 of valve seat 314. This translates to roughly 200 to 250 Newtons of force for an annular valve seat 314 having an exterior diameter of about 0.70 cm and a total contact surface area of about 0.233 cm$^2$. FIGS. 3A and 3B show the spring 322 used to apply force to the upper surface 328 of upper horizontal member 318 as a "Belleville" spring, which may also be referred to as a cone disk spring. The application of Belleville springs typically takes the shape of a series of coned disks stacked atop one another, concave side to convex side, as illustrated in FIGS. 3A and 3B.

FIGS. 3A and 3B show 8 cone disk springs, and the forces referred to herein are with respect to the 8 cone disk springs, but other numbers of such springs may be used, depending on the application. A Belleville spring provides the closing force required within a much smaller vertical distance "d" than would be required by a coil spring. This permits a much shorter valve actuator than can be achieved using coil springs. The metal-seated valve shown in FIG. 1 using coil springs to provide tight shutoff would typically require a "d" ranging from about 2.0 cm to about 3.0 cm, while a Belleville spring combination would typically require a "d" ranging from about 0.5 cm to about 2.0 cm.

The valve 300 is opened by pneumatic force, which is applied by admitting pressurizing gas (not shown) into the pneumatic chamber 309 via port 324. Since the movable surface area 330 of upper horizontal member 318 of sliding cylinder 321 is much larger than the movable surface area 311 of lower horizontal member 316, the pressurizing gas provides an upward motion against the operation of spring 322. The pressurizing gas (not shown) is admitted through one or more ports 324 from an external compressed air gas supply of 40-75 psig. The pneumatic pressure behind upper horizontal member 318 then overcomes the countervailing spring 322 force, urging the sliding cylinder 321 upward, in proportion to the amount of pressure applied via the pressuring gas. As sliding cylinder 321 moves upward, lower horizontal member 316 moves upward, relieving pressure upon diaphragm 302, which moves away from the metallic valve seat 314, opening the valve by an amount in proportion to the pressure applied via the pressurizing gas. For a valve of the kind shown in FIGS. 3A and 3B, where the movable surface area 330 is about 1.5 cm$^2$, the movable surface area 311 is about 0.40 cm$^2$, and the downward force applied by spring 322 to surface 328 of upper horizontal member 318 to crack the valve open is about 220 N. The pressurizing gas pressure applied will be in the range of about 1,480 kPa for an 8 spring valve to open the valve and will be in the range of about 2,220 kPa to provide full flow. In the event that the pressurizing gas leaks past the sliding seals 320, the gas can vent out through opening(s) 332 in housing 337.

In the drive section 306 of the valve 300, required metal-to-metal bonding may be advantageously accomplished using high-strength adhesives. While adhesives typically do not provide quite as strong or reliable a bond as diffusion bonding, they do not require subjecting the valve mechanicals present in the drive section 306 to the much higher temperatures and pressures involved in performing the diffusion bonding used in the wetted section 304. Adhesives are also much cheaper and simpler to use than diffusion bonding. Adhesives used in this application typically provide a shear strength of not less than 3,000 psi and a shear modulus of not less than 45,000 psi at 24° C. One example of an adhesive which has been satisfactory for this application is SCOTCH-WELD™ epoxy adhesive 2216 (B/A grey), which may be applied and bonding processed in the manner recommended by the manufacture, with respect to the particular materials being bonded. This particular adhesive acts as a sealant as well as an adhesive. One skilled in the art will be able to find other adhesive/sealant compositions which can be used in this application which typically requires functionality at room temperature up to about 40° C. For higher temperature applications, an adhesive/sealant having higher temperature functionality could be selected.

Due to the high cost of corrosion-resistant materials of the kind used in the manufacture of semiconductor processing equipment, as well as the high cost of space in the clean room environment of semiconductor fabrication facilities, there is a drive to reduce the size of the fluid handling devices used. In particular, recent emphasis has been placed on reducing the size of the fluid handling system in general, equipment which has historically occupied a substantial portion of the overall processing floor space.

Disclosed herein is a space conserving, integratable fluid handling network architecture for use in the chemical processing industry, where space is a concern, such as in semiconductor processing equipment. The fluid delivery network can be manufactured using the chemical etching and diffusion bonding techniques described with respect to the lower section 303 of the diaphragm valve described above.

In some instances, where the metals to be diffusion bonded are particularly difficult to etch, it may be necessary to use electrochemical etching to drive the etching process.

The integrated fluid handling network architecture includes a gas distribution assembly which comprises a structure including a plurality (i.e., at least two) of metal layers which have been diffusion bonded together. The number of metal layers in a typical gas distribution assembly generally ranges from about 3 to about 15. Each of the metal layers typically has a thickness within the range of about 0.0005 inch to about 0.06 inch; more typically, about 0.003 inch to about 0.05 inch; most typically, about 0.025 inch. The layers may have the same thickness, or vary in thickness, depending on the desired final structure.

The metal layers may be selected from a number of different corrosion-resistant materials. For purposes of illustration herein, the metal layers are typically selected from the group consisting of stainless steel, HASTELLOY®, and ELGILOY®, and combinations thereof. Specifications for 400 series stainless steel, HASTELLOY® C22, and ELGILOY® are presented in Table Two, below.

metal layers are advantageously etched using chemical etching, electrochemical etching, or a combination thereof, to provide the pattern of through-holes in prior to a diffusion bonding process in which the layers are melded together to become a functional fluid handling device. The use of chemical, and in particular electrochemical etching tends to provide a smoother surface on the through-hole, which aids in reduction of sources of particulate contamination from the fluid handling system. In some instances, depending on the surface condition of the metal layer prior to through-hole etching, the electrochemical etching process also reduces the roughness of the surfaces which are to be bonded during the diffusion bonding process, enabling lower roughness diffusion bonding.

Chemical or electrochemical etching of the metal layers to produce a pattern of openings in the layers is typically performed according to methods known in the art, which will depend on the particular metal to be etched. Electrochemical machining is a technique that has been in use for metal polishing and removal for several decades. Use of the driving force of an electrochemical process to enable the etching of

TABLE TWO

Specifications for 316L and 400 series Stainless Steel. HASTELLOY ® C-22 and ELGILOY ®

| Specification | 316L Series Stainless Steel | 400 Series Stainless Steel (Type 410) | HASTELLOY ® C-22 | ELGILOY ® |
|---|---|---|---|---|
| Composition (% by wt. Maximum) | 61.8Fe, 18Cr, 14Ni, 3Mo, 2Mn, 1Si, 0.1N, 0.045P, 0.03C, 0.03S | Fe balance, 12Cr, 1Mn, 1Si, 0.50Ni, 0.15C, 0.04P, 0.03S | 56Ni, 22Cr, 13Mo, 3W, 3Fe, 2.5Co, 0.50Mn, 0.35V, 0.08Si, 0.010C | 41Co, 21Cr, 16Ni, 11.4Fe, 8Mo, 2.5Mn, 0.15C |
| Avg. Surface Roughness (Ra) | 0.5-4.0 | 5-30 | 5-30 | 5-30 |
| Hardness, Rockwell ($R_C$) | | | | |
| Sheet | 25 | 43 | 15 | 45 |
| Plate | | | 15 | 60 |
| Melting Temperature (° C.) | 2500-2550 | 1482-1532 | 1357-1399 | 1427-1457 |
| Mean Coefficient of Thermal Expansion (m/m-° K.) | | | | |
| −18 to 315° C. | $0.5 \times 10^{-6}$ | | | |
| 20 to 600° C. | | $11.6 \times 10^{-6}$ | | |
| 24 to 649° C. | | | $14.6 \times 10^{-6}$ | |
| 0 to 500° C. | | | | $15.2 \times 10^{-6}$ |
| Thermal Conductivity (W/m²-° K.) | | | | |
| 27° C. | 0.63 | | | |
| 48° C. | | | 10.1 | 12.5 |
| 100° C. | | 24.9 | | |
| Specific Heat @ 52° C. (J/kg-° K.) | 500 | 459 | 414 | 430 |

The metal layers are patterned to contain a series of through-holes, which are typically round or oblong in shape, so that there are no sharp corners which can wear and produce particulates during operation of the fluid delivery system. The difficult to etch materials is well known in the art. For example, a paper was presented by D. M. Allen, and P. J. Gillbanks entitled: "The Photochemical Machining of Some Difficult-To-Etch Metals" at NEPCON WEST: Packing Production Testing, Feb. 25-27, 1986, which related to this subject matter. At the same conference, T. A. Allen, Sandia National Laboratories, presented work on the pulsating of an electrochemical cell to perform chemical machining of molybdenum through a photoresist mask.

Stainless steel can be chemically etched using ferric chloride according to standard methodology known in the art. A process for electrochemical etching of steel is described in U.S. Pat. No. 6,221,235, issued Apr. 24, 2001, to Gebhart. Although the Gebhart patent pertains to complete bulk dissolution of a sacrificial core, the application of a pulsed current of the kind described by Gebhart is also applicable to the etching of metal through a mask, as described by Datta in IBM J. Res. Dev. Vol. 42, No. 5, Sep. 98, pp. 655-669. The Datta disclosure combines the mass-manufacturability of an etch process which employs a patterned photoresist with pulsed electrochemical dissolution of the kind described in the Gebhart patent. As previously mentioned, the electrochemical machining technique has been used for molybdenum; and, the process can be applied to etching of HASTELLOY® and ELGILOY®.

It is possible to make highly corrosion-resistant metals, such as HASTELLOY® and ELGILOY® easier to pattern etch by chemical or electrochemical techniques by temporarily removing the microstructure which provides surface corrosion resistance. This may be accomplished by heating the metal to a temperature within the range of about 1800° F. to about 2000° F.; more typically, within the range of about 1825° F. to about 1975° F.; most typically, about 1900° F. Heat treatment is performed in an atmosphere of clean nitrogen for a time period within the range of a few minutes minimum. The metal is then cooled over a time period ranging from about 5 minutes to as much as 30 minutes. Chemical or electrochemical etching of the metal is then performed according to methods known in the art and described herein. Use of this method to adjust the microstructure of the corrosion-resistant metal prior to electrochemical etching is expected to improve the etch rate by a factor ranging from 100 to 1,000 times, depending on the particular alloy.

Following the pattern etching of the metal by chemical or electrochemical techniques, the microstructure of the metal must be returned to the metal in order for the metal to regain its original corrosion resistance. This is accomplished by heating the metal to a temperature greater than about 1,135° C. (2075° F.) (typically, no greater than about 1,200° C. (2192° F.)) for a few minutes minimum, followed by rapid cooling (quenching) of the metal to a temperature in the range of about 130° C. (266° F.) or less over a time period of about 5 minutes or less. The temperature at which the microstructure is returned to the metal is typically very close to the temperature at which the metal is diffusion bonded, so that the microstructure is typically returned to the metal during the diffusion bonding process. However, following heating of the metal during the diffusion bonding process, the metal must be cooled to a temperature of less than about 135° C. (275° F.) (typically, to a temperature within the range of about 80° C. (176° F.) to about 135° C. (275° F.)) within a time period of less than about 5 minutes in order for the microstructure of the metal to be returned. Optionally, the heat treatment/rapid cooling process can be performed as a separate processing step prior to performance of the diffusion bonding process. The above method is particularly useful for treatment of corrosion-resistant metal alloys which contain between about 43 to about 71 weight % nickel, and between about 1 to about 30 weight % chromium, such as the HASTELLOY® series of alloys (available from Haynes International, Inc., Kokomo, IN), which includes HASTELLOY® B-2, HASTELLOY® B-3, HASTELLOY® C-4, HASTELLOY® C-22, HASTELLOY® C-2000, HASTELLOY® C-276, HASTELLOY® G-30, and HASTELLOY® N. One skilled in the art with minimal experimentation can determine what the heating and quench cycles should be to adjust the microstructure for easy etching and then to return the microstructure to its original corrosion resistant properties after etch using a similar heat and quench cycle.

Although Stainless Steel 410, for example and not by way of limitation, may be able to be cleaned and diffusion bonded without the need to adjust the microstructure of the steel, the hardness of the steel layer underlying the metallic seat 314 shown in FIG. 3B needs to be improved after diffusion bonding. Metallic seat 314 cannot provide the proper seal unless the metallic layer 348 underlying the metallic seat 314 exhibits a Vickers hardness of at least 300. The adjustment of the metal microstructure to improve the hardness of the Stainless Steel 410 is achieved by heating the metal to a temperature of at least 980° C. for a time period ranging from about 3 minutes to about 10 minutes, followed by a quenching to a temperature in the range of about 135° C. within a period of less than about 5 minutes.

Stainless Steel 316L hardness improvement is more difficult. The 316L Stainless Steel requires surface working for hardening. This may be accomplished by roller burnishing of the surface of layered substrate layer 348 through counter bore 310 after the diffusion bonding.

In addition to adjusting the hardness of a stainless steel layer underlying metallic seat 314, surfaces of the stainless steel which are to be contacted with corrosive fluids may need to be treated to improve resistance to corrosion after the diffusion bonding step. Treatment to improve corrosion resistance may be carried out prior to the roller burnishing of the surface of a stainless steel layer 348 when that layer is 316L Stainless Steel. Treatment of stainless steel layers to improve corrosion resistance will be discussed subsequently herein.

One of the benefits of chemical or electrochemical etching over other methods of machining is that it is possible to make changes in the design of the component easily and at a low cost. It is possible to make either small or large quantities of etched components, and the process becomes more cost effective as the number of components produced increases.

In general, in order for diffusion bonding to be most effective, the metal surfaces that are to be bonded must have an average surface roughness within the range of about 0.1 microinches Ra to about 5 microinches Ra, with a maximum surface roughness not to exceed about 30 microinches Ra, prior to diffusion bonding. Typically, the metal surfaces to be bonded have a surface roughness within the range of about 0.5 microinches Ra to about 5 microinches Ra. We have found that diffusion bonding works quite well when the metal surfaces have a surface roughness within the range of about 1.5 microinches Ra to about 3.0 microinches Ra.

As previously mentioned, it is possible to directly purchase some grades of stainless steel which meet surface roughness requirements, and the metal surfaces not will need to be pretreated to have the desired surface roughness prior to diffusion bonding. If the desired surface roughness material is not available, 316L and 400 series stainless steels can be electropolished, using techniques known in the art, to provide the desired surface roughness. Once the desired surface roughness is achieved, the stainless steel layers can be diffusion bonded into the desired layered substrate assembly. After diffusion bonding, it is necessary to treat the stainless steel surfaces which are to be exposed to corrosive fluids to render such surfaces more corrosion resistant. For this reason, it is recommended that the layered substrate layers which are to be exposed to corrosive fluids be fabricated from a corrosion-resistant material such as HASTELLOY® or ELGILOY®. However, for cases where it is considered to use a stainless steel layer in the layered substrate at a location which is exposed to corrosive fluids, the surfaces of the stainless steel layers which will be exposed to corrosive fluids may be passivated after the diffusion bonding step. The passivation step typically tends to bring more of the chromium present in the steel to the surface of the steel. The passivation step involves exposing the stainless steel substrate to a series of steps which are illustrated in FIG. 10.

Figure 10:
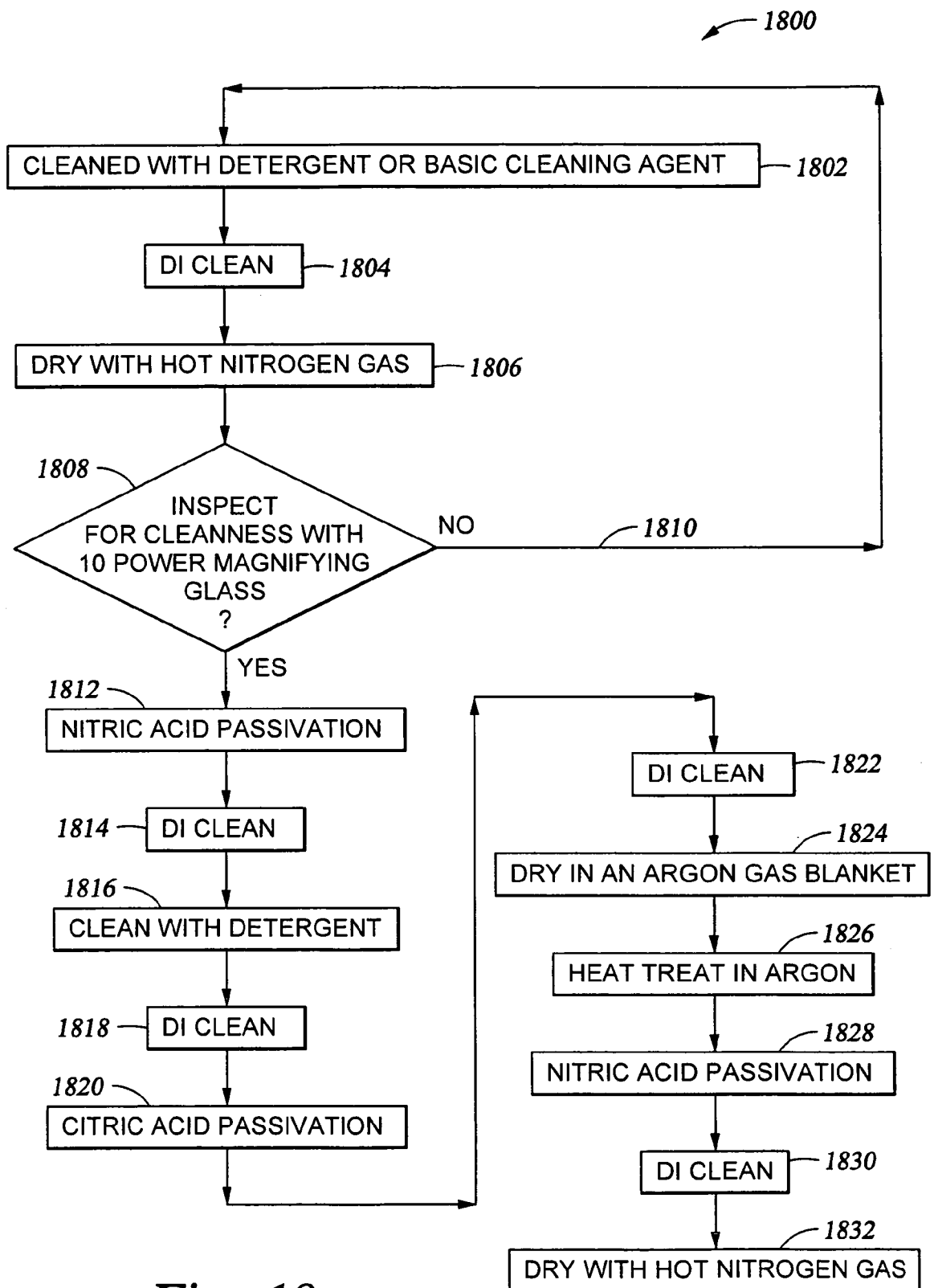
FIG. 10 is a process flow diagram for a process for passivation of a stainless steel surface to render it more corrosion resistant.

In particular, with reference to FIG. 10, a diffusion bonded layered substrate containing stainless steel surfaces to be passivated is treated using the method 1800 shown in FIG. 10. The stainless steel surfaces are cleaned 1802 with a first detergent or cleaning agent. If any of the surfaces have been machined after diffusion bonding, these surfaces need to be degreased to remove grease, metal filings or cutting/drilling fluids. We have found that a good cleaning agent for this purpose is a solution of potassium hydroxide, about 35% by volume in deionized water. A solution of the cleaning agent may be sprayed on the surface to be cleaned, to provide good agitation of the surface and then the part may be immersed into a bath (typically ultrasonically agitated) to clean out holes and cavities. A typical immersion bath temperature is about 60° C. and a typical time period for treatment is about 20 minutes. After detergent cleaning, the layered substrate (or other stainless steel part) is rinsed/cleaned 1804 using deionized water, followed by drying 1806 with hot nitrogen gas which is typically at a temperature ranging from about 65° C. to about 75° C. Treated surfaces are then inspected for cleanliness using a 10 power or higher magnifying glass and if the surfaces are free from contamination which will affect the ability of the surface to perform its function, the part comprising the stainless steel surface to be treated is sent on for nitric acid passivation 1808. If the surfaces are not free from contamination, steps 1802 through 1808 are repeated 1810 until such surfaces are properly cleaned.

The nitric acid passivation process 1812 comprises treating the cleaned stainless steel surface with a solution which is 20% by volume nitric acid in a deionized water base. The stainless steel parts are contacted with the nitric acid solution for a time period ranging from about 25 minutes to about 30 minutes at a temperature ranging from about 45° C. to about 50° C.

After treatment with the nitric acid solution, the stainless steel surfaces are rinsed 1814 with deionized water, followed by treatment with a second detergent. Although one skilled in the art may select a suitable detergent, we found that ALCONOX® Powdered Precision Cleaner, a trisodium phosphate, dissolved to make a 1% by weight solution in deionized water works well. The stainless steel surfaces were immersed in a circulating bath made up from about 2.5 to 3 teaspoons of the ALCONOX® Powdered Precision Cleaner in one gallon of deionized water, and were allowed to remain in the bath at a temperature of about 40° C. to about 50° C. for a time period of about 30 minutes. This cleaning step 1814 is followed by a clean/rinse 1816 with deionized water.

The stainless steel surfaces are subsequently treated 1820 with a citric acid and deionized water solution having a specific gravity of about 1.25 and a pH of about 1.8, which may contain surfactants. We used CITRISURF™ 2050 available from Stellar Solutions at stellarsolutions.net, which is recommended for use over a temperature range from about 45° C. to about 70° C. We immersed the stainless steel surfaces in a circulation bath for about 30 minutes at about 65° C. The treatment step 1820 was followed by a deionized water clean/rinse 1822 which was carried out in an immersion bath for about 15 minutes at a temperature ranging from about 60° C. to about 70° C. Subsequently, the stainless steel surfaces were dried 1824 in a n argon atmosphere at about 70° C. for a time period of about 10 minutes.

The stainless steel surfaces were then heat treated 1826 at about 100° C. in a pure, filtered argon gas atmosphere for a time period of about 1 hour.

Finally, the stainless steel surfaces are again treated 1828 with the 20% by volume nitric acid in a deionized water base for a time period of about 20 minutes to about 25 minutes over a temperature range of about 45° C. to about 55° C. The treatment 1828 was followed by a clean/rinse 1830 with deionized water in a circulation bath for a time period ranging from about 10 minutes to about 15 minutes at a temperature ranging from about 65° C. to about 75° C. The clean/rinse treatment 1830 was followed by a drying step 1832 using hot nitrogen gas in the manner described above.

The same passivation process described above can be applied to the stainless steel surfaces of layers which are to be exposed to corrosive fluids in general. This may be the case when the stainless steel layers are used in an area of a part containing elements which cannot withstand the temperatures required for diffusion bonding and an adhesive is used for bonding purposes, as previously discussed.

After the above passivation process, the treated parts including the passivated stainless steel surfaces or layers of stainless steel which are awaiting bonding into a layered substrate should be placed in protective packaging for storage. An acceptable protective packaging comprises a nylon inner bag enclosed in a double bag of polyethylene. The package may be pressure sealed with an inert gas on the interior or may be vacuum sealed.

The passivation step results in chromium from the bulk of the stainless steel being pulled toward exposed surfaces of the stainless steel, providing chromium enhancement at the exposed surfaces. Oxidation of the chromium to form chromium oxide at the exposed substrate surfaces is performed simultaneously with the chromium enhancement. The chromium-rich surfaces of the stainless steel are more chemically inert, and therefore more corrosion-resistant, than prior to performance of the passivation step.

Following are the descriptions of fabrication of various fluid flow network architecture components which are diffusion bonded at least in part to become part of the network architecture. The first description pertains to how the basic fluid flow channels are created for use in the network; this is followed by illustrations of how various devices are partially or fully integrated into the network architecture which contains the basic fluid flow channel; subsequently descriptions of two embodiments of fully integratable devices are presented; and, finally, an entire gas pallet which illustrates the network architecture (excluding the control system) is presented.

Figure 5A:
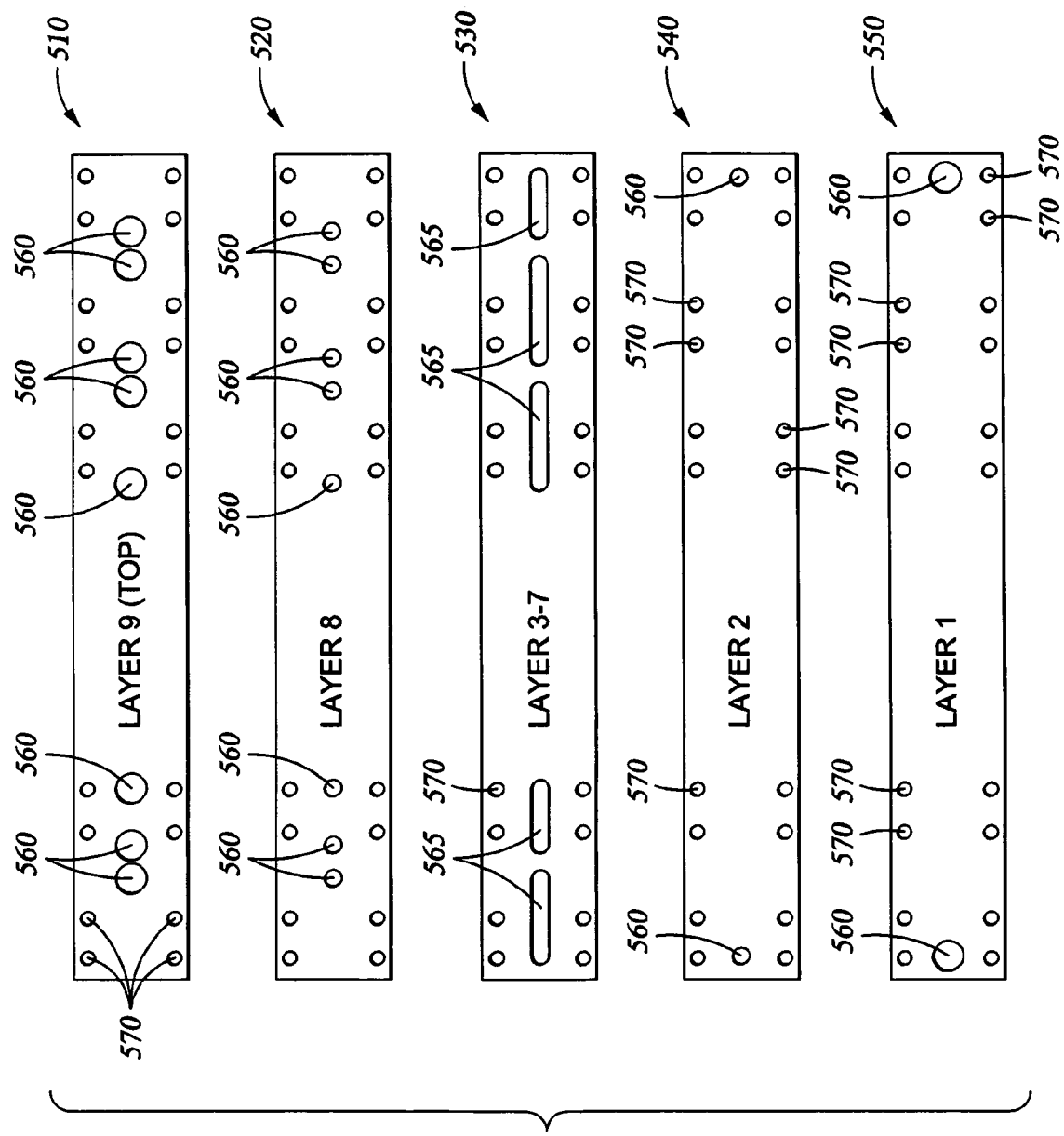
FIG. 5A is a top view of a series of differently patterned, chemically or electrochemically etched metal layers (510, 520, 530, 540, and 550) of the kind which can be diffusion bonded to form a fluid handling structure.
Figure 5B:
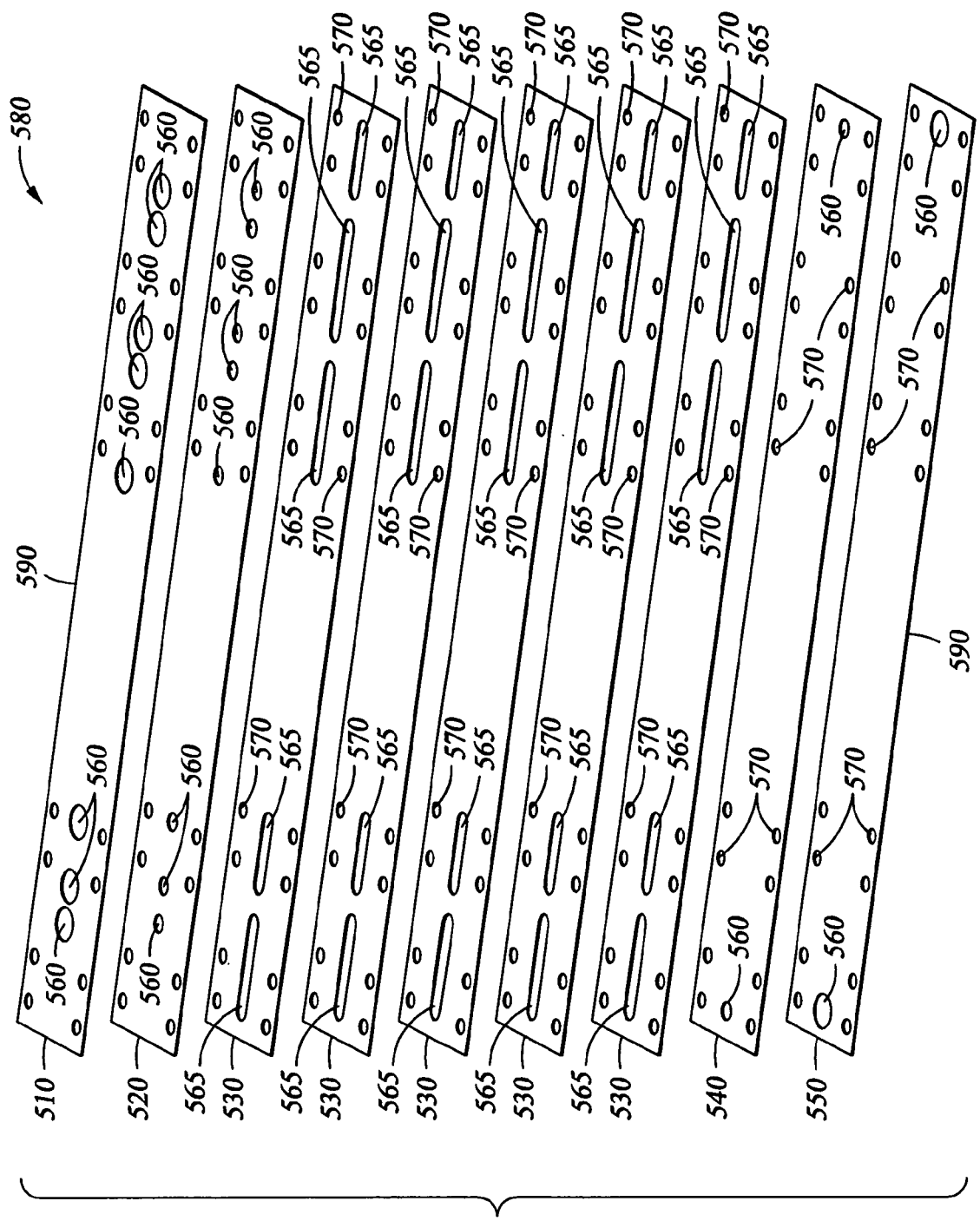
FIG. 5B is a three dimensional expanded view of an assembly of the patterned metal layers shown in FIG. 5A, but rotated by 180 degrees. Metal layer 530 was repeated five times to produce the proper dimensions of a shape within the nine-layer structure.

FIG. 5A is a top view of five metal layers each of which has been patterned differently for use in forming a network channel structure. The patterned metal layers (510, 520, 530, 540, and 550), each exhibit through-holes which were formed using the chemical or electrochemical etching previously described. These through-holes serve various functions in the final gas distribution assembly. For example, certain through-holes 560 and "slots" 565 are used for gas transport. Other through-holes 570 can be threaded and used for attachment of surface-mounted components, or to screw together several diffusion-bonded sub-units (such as structure 600 shown in FIG. 6A). The total assembly 580 used to form one embodiment of a channel network makes use of nine layers. This assembly is shown in FIG. 5B. With reference to FIG. 5A, the bottom layer, layer 1, includes shaped through holes 560 for gas transport. Layer 2 includes additional shaped through holes 560 for gas transport. Layers 3-7 include shaped through hole slots 565 for gas transport. Layers 8 and 9 both include shaped through holes 560 for gas transport.

Following chemical etching to form the through-holes, two or more of the metal layers (such as those shown in FIG. 5A) are stacked and aligned, prior to diffusion bonding. FIG. 5B is a three dimensional view showing an expanded assembly of the patterned metal layers shown in FIG. 5A, but rotated by 180 degrees. FIG. 5B shows all of the layers, including layers 3-7 which are the patterned metal layer 530 of FIG. 5A. A through-hole in one layer is typically aligned with a through-hole 560 or a shaped through hole slot 565 in at least one adjacent layer, to form a gas flow channel running through the stack of metal layers.

Diffusion bonding of the metal layers (such as layers 510, 520, 530, 540, and 550, shown in FIG. 5A) is performed as described above, with respect to the manufacture of the lower metal portion of the diaphragm valve, according to the process conditions set forth in Table One.

As described with respect to the manufacture of the diaphragm valve, some layers in the network architecture may be diffusion bonded, while other layers may be bonded using conventional adhesives suitable for high-strength bonding of metals. The choice of using either diffusion bonding or adhesive bonding depends on the ultimate function of each layer within the network architecture. In some instances several layers of a given pattern may be used to arrive at a particular thickness. In other instances, because of the function of the layer, a diffusion bondable material may not be what is required and the layer will be applied using an adhesive.

Following diffusion bonding (or a combination of diffusion bonding certain layers and adhesive bonding other layers), the side edges 590 of the bonded structure (not shown) may be machined to provide a smoother, more even surface. Machining of the edges 590 (shown in the FIG. 5B assembly prior to bonding) may be performed using conventional machining techniques known in the art. Other post-diffusion bonding steps may include roller burnishing of counter-bore sealing surfaces, tempering, hole tapping, and surface treatment, such as electropolishing or chemical passivation.

Figure 6A:
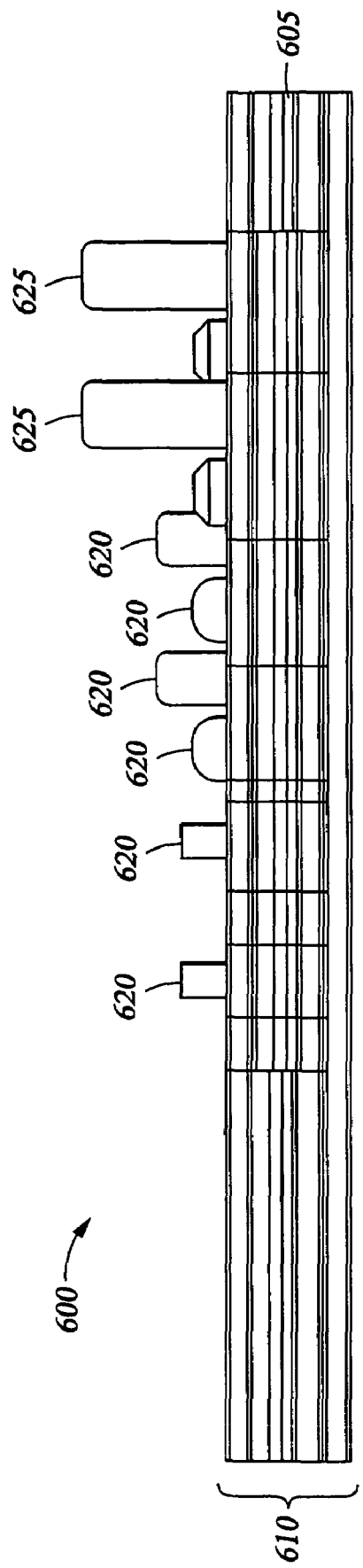
FIG. 6A is a schematic of a side view of a gas distribution network architecture assembly 600 which includes a number of diffusion-bonded sub-units 610 (similar to structure 500 shown in FIG. 5B), in addition to various component devices 620, some of which are more integrated into the underlying substrate 605 than others.

In some embodiments of the invention, various component devices may be surface mounted to a network of gas flow channels which are a part of the network architecture. The component devices are typically attached to the network structure using threaded pins or bolts which are screwed into threaded openings within the gas distribution assembly, typically at the edges of the assembly. Shaped through holes useful for this purpose are illustrated as holes 570 (threading not shown) in expanded assembly 580 illustrated in FIG. 5B. Component devices attached in this matter are typically flush mounted on the upper surface of the diffusion bonded channel network structure. Such component devices include, for example and not by way of limitation, valves, filters, pressure sensors, actuators, pressure transducers, and flow controllers. Surface mounting of components is described, for example, in U.S. Pat. No. 5,860,676, issued Jan. 19, 1999, to Brzezicki et al.; U.S. Pat. No. 6,231,260, issued May 15, 2001, to Markulec et al.; U.S. Pat. No. 6,260,581, issued Jul. 17, 2001, to Hollingshead; and U.S. Pat. No. 6,502,601, issued Jan. 7, 2003, to Eidsmore et al. A network architecture which includes both a fluid flow channel network and various component devices is illustrated in FIG. 6A. FIG. 6A shows an integrated structure 600 in which portions of the various component devices are integrated to different degrees into the diffusion bonded substrate 605. Components that are well suited for incorporation into and diffusion bonding with the metal layers include valves, pressure sensors, flow sensors, temperature sensors, filters, pressure regulators, and check valves (for example, and not by way of limitation). FIG. 6A is a schematic side view of a gas distribution assembly 600 which includes a number of diffusion-bonded layers which for the base structure 610 (bonded layers similar to the expanded assembly shown in FIG. 5B), in addition to surface-mounted components 620 and 625, for example.

Figure 6B:
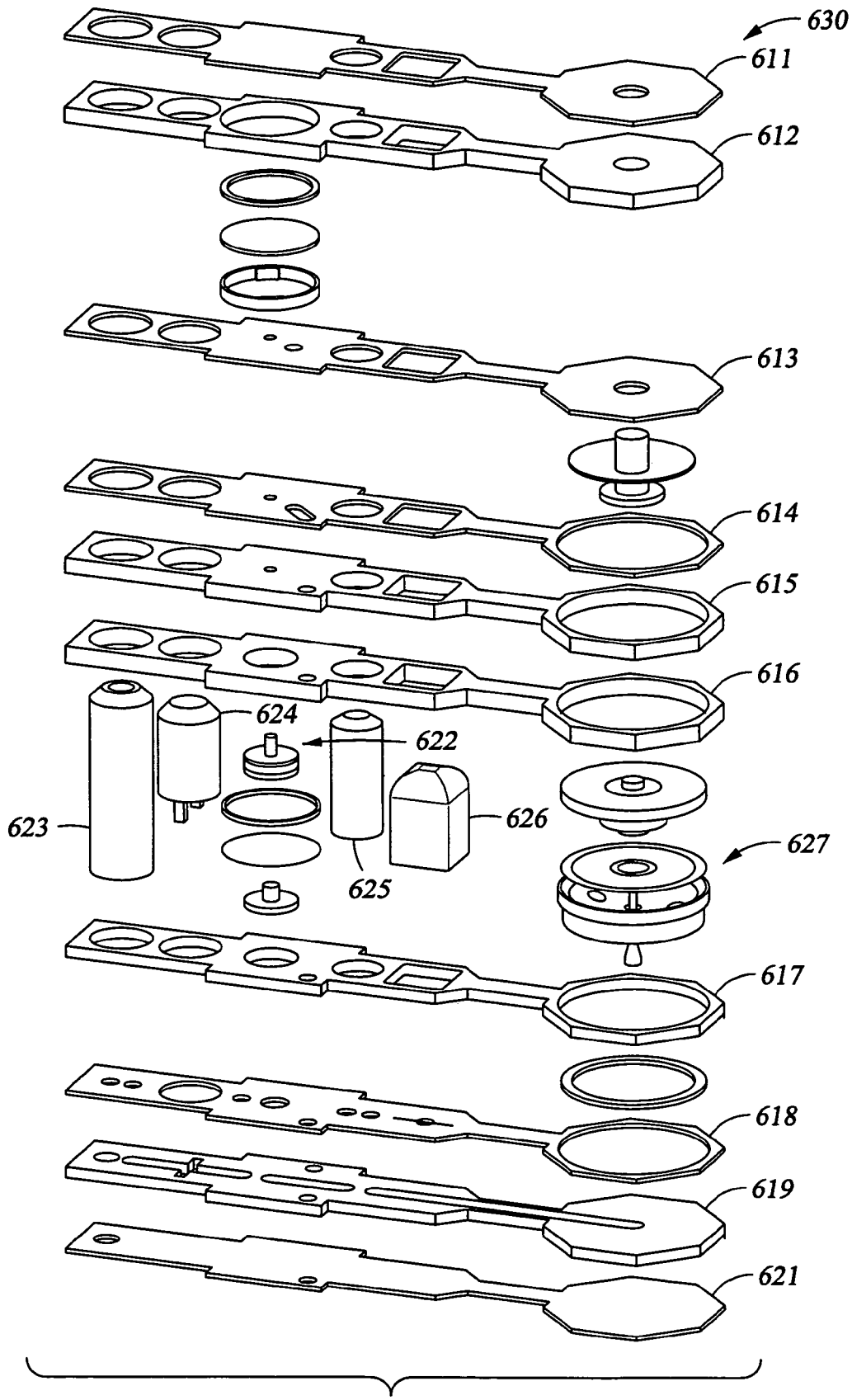
FIG. 6B is a three-dimensional, break-apart view of a gas distribution network architecture assembly similar to that shown in FIG. 6A, with a high degree of integration of various component devices into the underlying substrate.

FIG. 6B is a three-dimensional, break-apart view of a gas distribution assembly 630, where the component devices are highly, if not fully integrated into a diffusion bonded substrate. In this depicted embodiment, gas distribution assembly 630 includes individual, sub-units 617, 618, 619, and 621 which are diffusion bonded, while other sub-units 611, 612, 613, 614, 615, and 616 are either adhesively bonded or laser welded. Partially integrated components include a valve 622, proportional valve 623, velocity sensor 624, filter 625, pressure sensor 626, and pressure regulator 627.

FIGS. 7A-7E show various views of a pressure sensor 700, which is a component device which can be prepared using the chemical etching and diffusion bonding techniques described herein and which can be completely integrated into the gas channel distribution network portion of the network architecture.

Figure 7A:
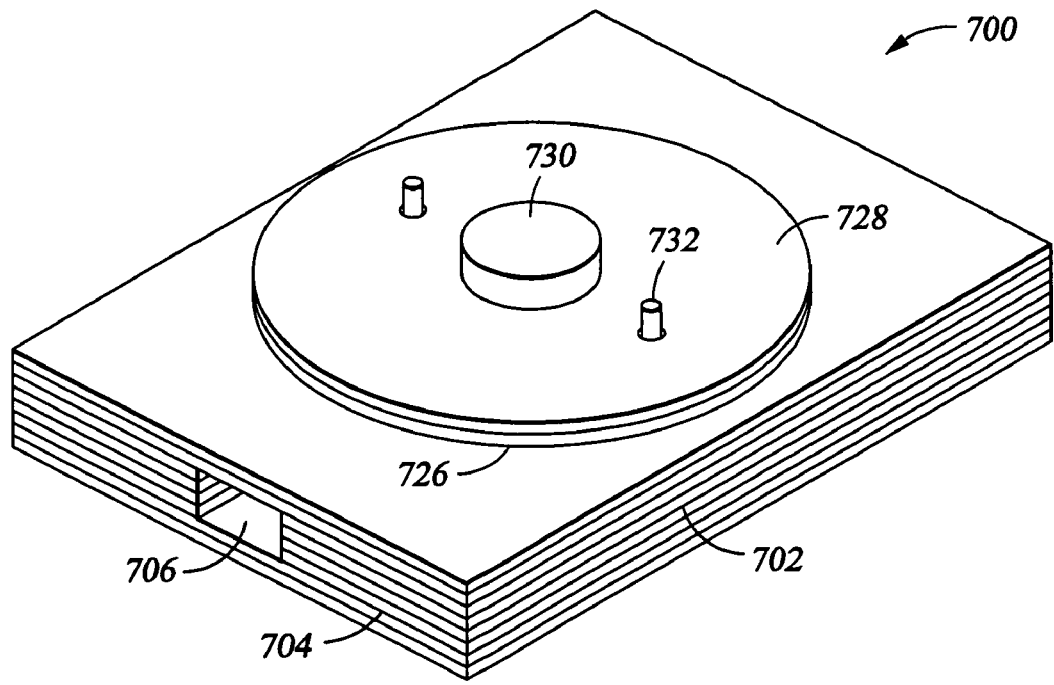
FIG. 7A is a schematic three-dimensional schematic diagram of an integratable multi-layered pressure sensor 700 of the kind which can be fully integrated into a multi-layered fluid handling network architecture.

FIG. 7A shows a schematic three dimensional view of the pressure sensor 700, including closed side 702; fluid entry (or exit) side 704, with opening 706 into which fluids enter or exit; a getter pump 730 at the top of the unit; electrical contact pins 732; cap 728; and a spacer 726, which will be described later with respect to FIG. 7F.

Figure 7B:
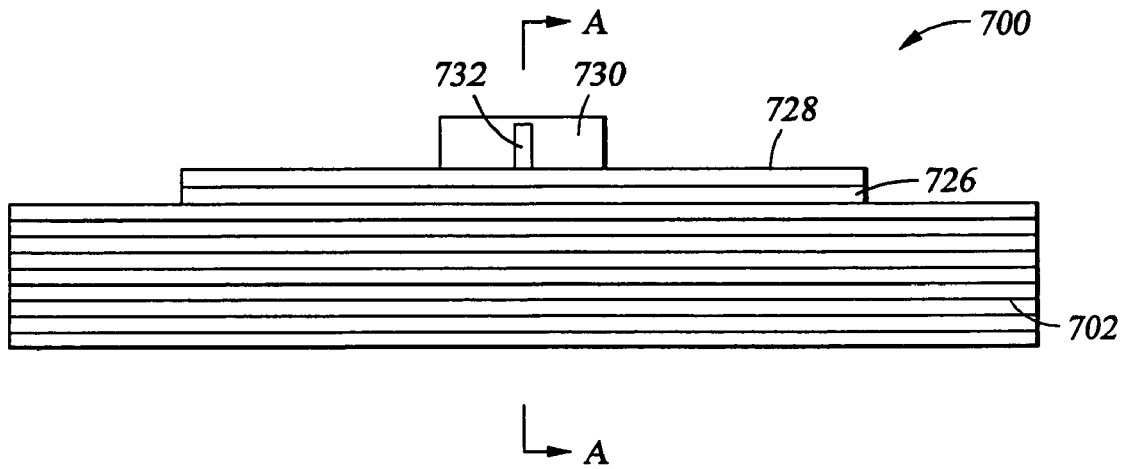
FIG. 7B is a schematic diagram of a side view of side 702 of the pressure sensor 700 shown in FIG. 7A, with a cross-sectioning marker A-A illustrated thereon.

FIG. 7B is a schematic diagram of a side view of closed side 702 of the pressure sensor 700 shown in FIG. 7A, with a cross-sectioning marker A-A illustrated thereon. FIG. 7D is a schematic diagram of the cross-sectional view A-A of the pressure sensor 700 shown in FIG. 7B.

Figure 7C:
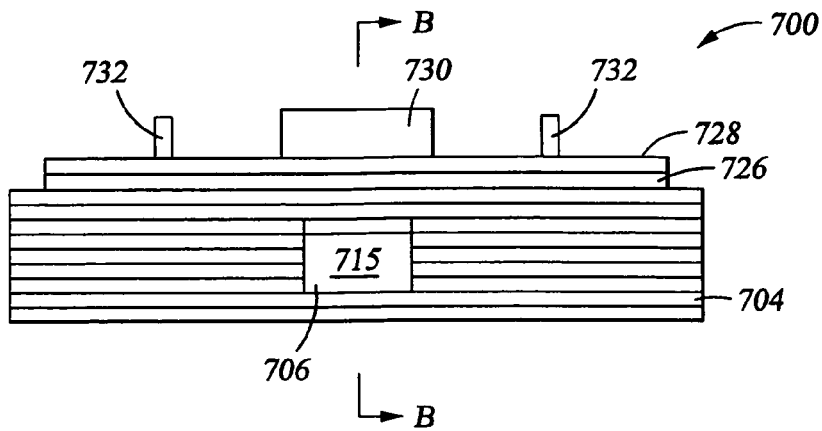
FIG. 7C is a schematic diagram of a side view of side 704 of the pressure sensor 700 shown in FIG. 7A, with a cross-sectioning marker B-B illustrated thereon.
Figure 7D:
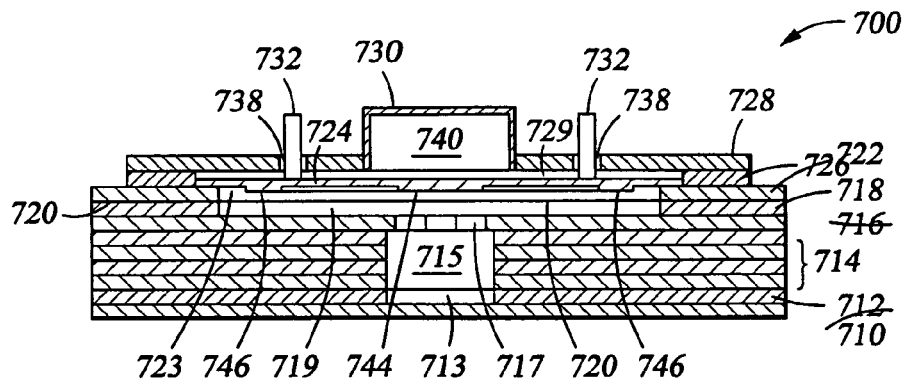
FIG. 7D is a schematic diagram of the cross-sectional view A-A of the pressure sensor 700 shown in FIG. 7B.
Figure 7E:
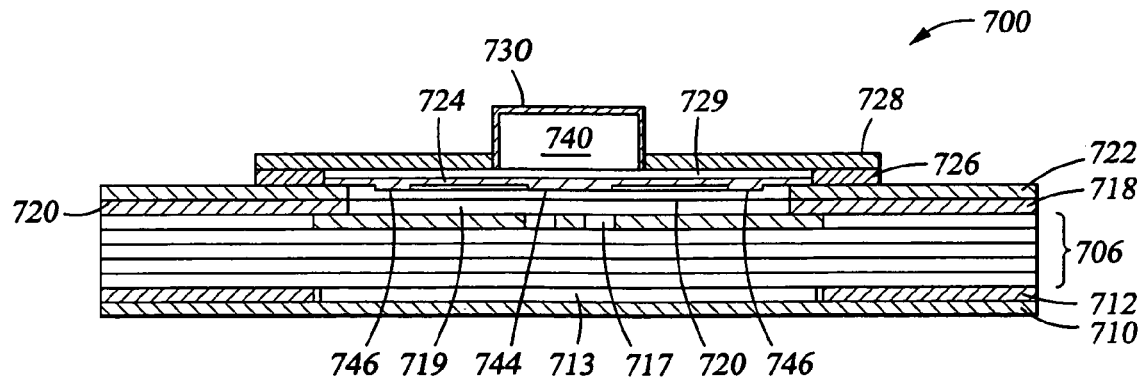
FIG. 7E is a schematic diagram of the cross-sectional view B-B of the pressure sensor 700 shown in FIG. 7C.

FIG. 7C is a schematic diagram of a side view of side 704 of the pressure sensor 700 shown in FIG. 7A, which includes entrance (or exit 706) into a channel 715 for fluid flow. FIG. 7E is a schematic diagram of the cross-sectional view B-B of the pressure sensor shown in FIG. 7C.

Figures 7F, 7G:
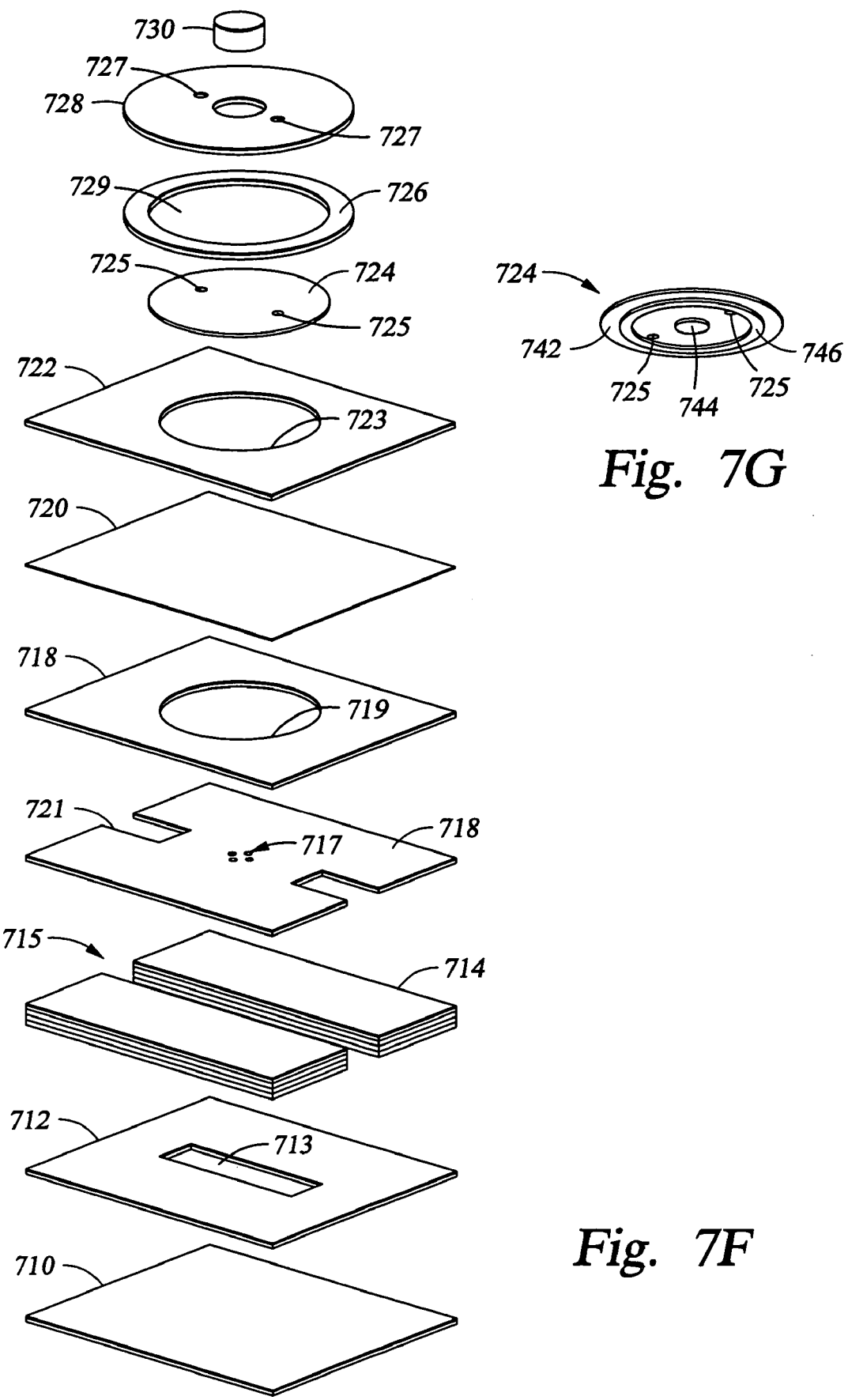
FIG. 7F is an exploded three dimensional view of the pressure sensor 700 shown in FIG. 7A, illustrating the individual component layers which make up the fully integratable pressure sensor.
FIG. 7G is an enlarged view of underside 742 of the ceramic disk 724, illustrating the center electrode 744 and the exterior electrode 746.

FIG. 7D, the section A-A view of FIG. 7B, shows in detail the relationship of a portion of the elements of the pressure sensor 700 after diffusion bonding of various layers (which are shown in FIG. 7F) to form a compact, integrated structure. The integrated structure is part of a network architecture (not shown) where at least a portion of the layers which make up the pressure sensor 700 extend to become portions of other component devices or fluid channel networks as well. FIG. 6B shows how single layers within the network perform as parts of more than one component device, for example. In more detail, FIG. 7D shows the fluid flow channel 715 through which fluids may enter (or exit), where channel 715 is created when patterned openings in an assembly of layers 714, such as those shown in FIG. 7F, are bonded together. Near the exterior base 710 of pressure sensor 700 is a slot 713 which counteracts the effects of volume changes in the fluid flow when only a portion of the fluid volume is directed toward the sensing area. The portion of the fluid flow (not shown) which is sent to the sensing area passes through openings 717 (shown in FIG. 7E) in layer 716 into a first chamber 719 beneath metal diaphragm 720. Openings 717 help to prevent sudden fluid flow fluctuations. Pressure exerted upon metal diaphragm 720 by the fluid deforms metal diaphragm 720 (typically fabricated from a relatively thin (typically about 0.003 inch thick) layer of a material such as ELGILOY®, upward into a second chamber 723 beneath a dielectrically insulating (typically ceramic) disk 724 which has dual electrodes 744 and 746 present on its lower surface, which then passes through (not shown) to the upper surface of disk 724 through openings 725 where they are contacted by electrical contact pins 732. The electrically insulative disk 724 forms part of a capacitor, in combination with metal diaphragm 720 and as diaphragm 720 deforms, changing the spacing between elements in the capacitor, the amount of current passing through the electrodes on the electrically insulative disk 724 changes. This change in electrical current is an indication of a pressure change which can be monitored. Also illustrated in FIG. 7D are layer 712 (which includes slot 713), four fusion-bonded layers which form opening 706 (conduit 715), layer 716 which contains openings 717 which provide fluid contact with diaphragm 720; layer 718 which includes opening/first chamber 719; layer 722 which contains opening/second chamber 723; and spacer 726 which permits formation of a third chamber 729 overlying ceramic disk 724. Getter pump 730 sustains a vacuum in third chamber 729 overlying ceramic disk 724. The vacuum acts as a reference pressure far below sensing pressures, so that changes in pressure are only one side of the diaphragm. Use of the vacuum in the third chamber 729 permits a read out of absolute pressure rather than a pressure relative to atmospheric pressure.

The pressure sensor could be designed to have the pressure in chamber 729 be substantially higher than the pressure being sensed, in which case the pressure in chamber 729 would cause the diaphragm 720 to deform in a downward direction. Further, no getter pump 730 would be required. The pressure sensor can also be used as a pressure gage, relative to atmospheric pressure if desired for a particular application.

FIG. 7E is a schematic diagram of a side view of side 704 of the pressure sensor 700 shown in FIG. 7A, and is the cross section B-B of FIG. 7C. This view of pressure sensor 700 illustrates openings 725 through which chambers 729 and 723 are connected and held under vacuum.

FIG. 7F is an exploded schematic three dimensional view of the pressure sensor 700 shown in FIG. 7A, illustrating the individual component layers which make up the fully integratable pressure sensor. In particular, bottom layer 710 forms the exterior base of the pressure sensor 700. Layer 712 includes slot 713 which counteracts volume change effects, to reduce the amount of pressure drop when the fluid (not shown) in the sensor 700 passes through openings 717 in layer 716, with excess fluid passing through slots 721. The slots 721 work in combination with 713 to help control volume effects, and therefore pressure effects of the fluid passing through openings 717. Further, slots 721 are typically used to connect to flow channels within a fluid flow network. Layer 718 is used to form a first chamber 719 beneath diaphragm 720 and above openings 717 through which the fluid passes. The fluid in first chamber 719 presses against diaphragm 720 causing a deformation of the portion of the diaphragm 720 which is in contact with second chamber 723 formed within layer 722. An electrically insulating (typically ceramic) disk 724 includes electrical contacts 744 and 746 present on its underside 742 as shown in FIG. 7G. These contacts pass through openings (not shown) in the upper surface of disk 724 to provide contact points for the electrical contact pins 732 shown in FIG. 7D. These contact pins 732 are electrically isolated from the general metallic body of pressure sensor 700 by electrically insulating eyelets 738. The interior of spacer 726 is sufficiently thick to create a third chamber 729 above the surface of disk 724, which is connected to chamber 723 through openings 725. The cap 728 forms the major upper exterior surface of pressure sensor 700 and includes openings 727 through which electrical contact pins 732, insulated by an insulating eyelet, a glass insulator, for example, pass to contact electrical contacts (not shown) on the upper surface of disk 724. A getter pump 730, typically fabricated from titanium, on the upper surface of cap 728 is used to maintain a steady state vacuum in third chamber 729 and in second chamber 723 at a given temperature.

The typical thickness of the metal layers in the multilayered pressure sensor 700 is about 0.025 inches. The majority of the layers are stainless steel (typically series 400 stainless steel). The diaphragm 720 typically has a thickness of about 0.003 inches, and is fabricated from ELGILOY® or a similar nickel/cobalt/chrome alloy which provides a more "spring like" behavior. Electrical contact pins 732 are typically fabricated from copper, and getter pump 730 typically contains a material such as titanium, which soaks up free fluid molecules from third cavity 729 and second cavity 723.

Figure 8A:
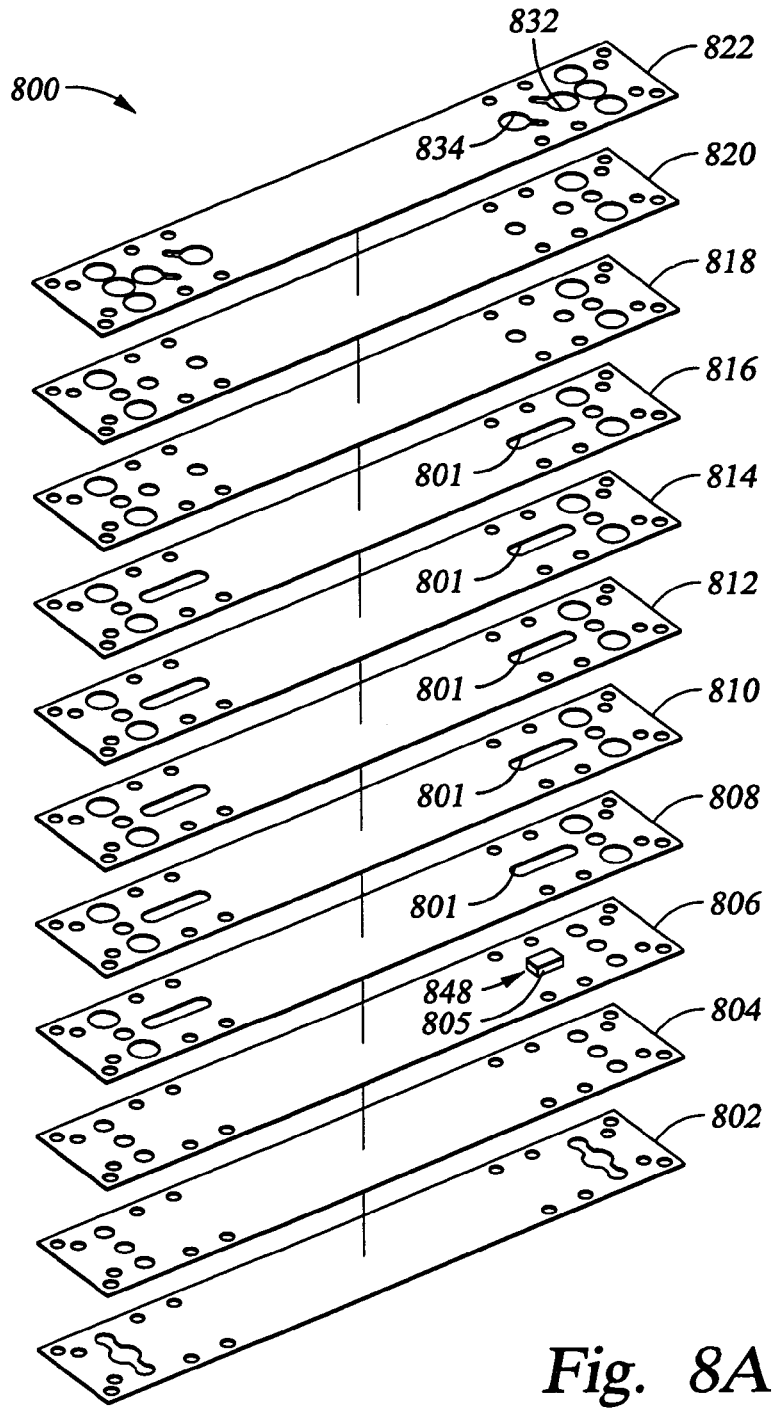
FIG. 8A is a schematic break-away view of a starting structure 800 for forming a layered structure 830 including a fully integratable in-line filter.

FIG. 8A is a schematic break-away view of a starting structure 800 for forming a layered substrate 830 which includes a fully integratable in-line filter 850 (shown in FIGS. 8C and 8D). FIG. 8A shows a series of layers of the kind which are shown in FIGS. 5A and 5B. FIG. 8A is used to illustrate how a totally integratable filter can be formed in a space within a fluid flow network, so that the fluid flow will be filtered in line as the fluid passes through the network architecture. The layers 808 through 816 each contain a slot 807 into which a sinterable media 848 will be placed. Typically, sinterable media 848 in a green state is placed in a block or shaped structure 805 on the upper surface of layer 806, so that when all of the layers are compressed, the sinterable media 848 will pass through all of the slots 807 and fill a space made by the slots in the matter shown in FIGS. 8C and 8D.

Figure 8B:
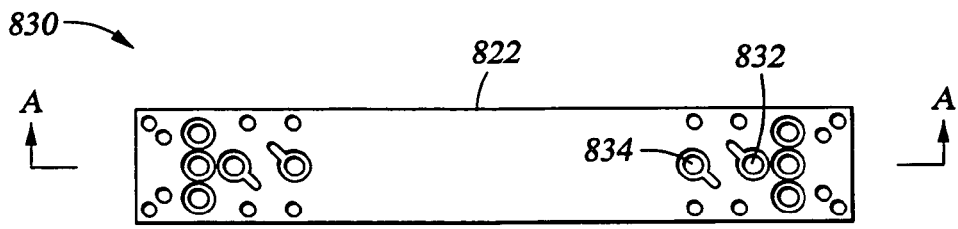
FIG. 8B is a schematic showing a top view of the layered structure 830 produced from starting structure 800, with cross-sectional marker A-A illustrated thereon.

FIG. 8B is a schematic showing a top view of a diffusion bonded layered substrate 830 showing the top layer 822, fluid entrance 832 and fluid exit 834. FIG. 8B also is marked to show cross-sectional marker A-A.

FIG. 8C is a schematic of the cross-sectional view of layered substrate structure 830. During the diffusion bonding of layered structure 830, the sinterable media 848 has been forced to fill a defined space between fluid entrance 832 and fluid exit 834. The sintered media forms an in-line filter 850 for filtering out particulates which may enter the fluid flow channel 836 of layered structure 830. Layered structure 830 may be part of a larger layered structure (not shown), or component devices (not shown) such as valves may be attached over fluid entrance opening 832 and fluid exit opening 834.

Layers 804 and 820, shown in FIGS. 8C and 8D (which is a more three-dimensional view of cross section A-A) are typically fabricated from ELGILOY® to provide a hard sealing surface during and after the diffusion bonding of structure 830. Other layers in the structure may be series 400 stainless steel, for example and not by way of limitation. The thickness of an ELGILOY layer may be in the range of 0.004 inches, by way of example and not by way of limitation, compared with the stainless steel layers which are typically in the range of about 0.025 inches, by way of example and not by way of limitation.

The ELGILOY® layers can be used as the diaphragm 302 of the valve 300 previously described, as well as the diaphragm 720 for the sensor 700, and also to provide the hard sealing surface for counterbores used for surface mount components.

Figure 9A:
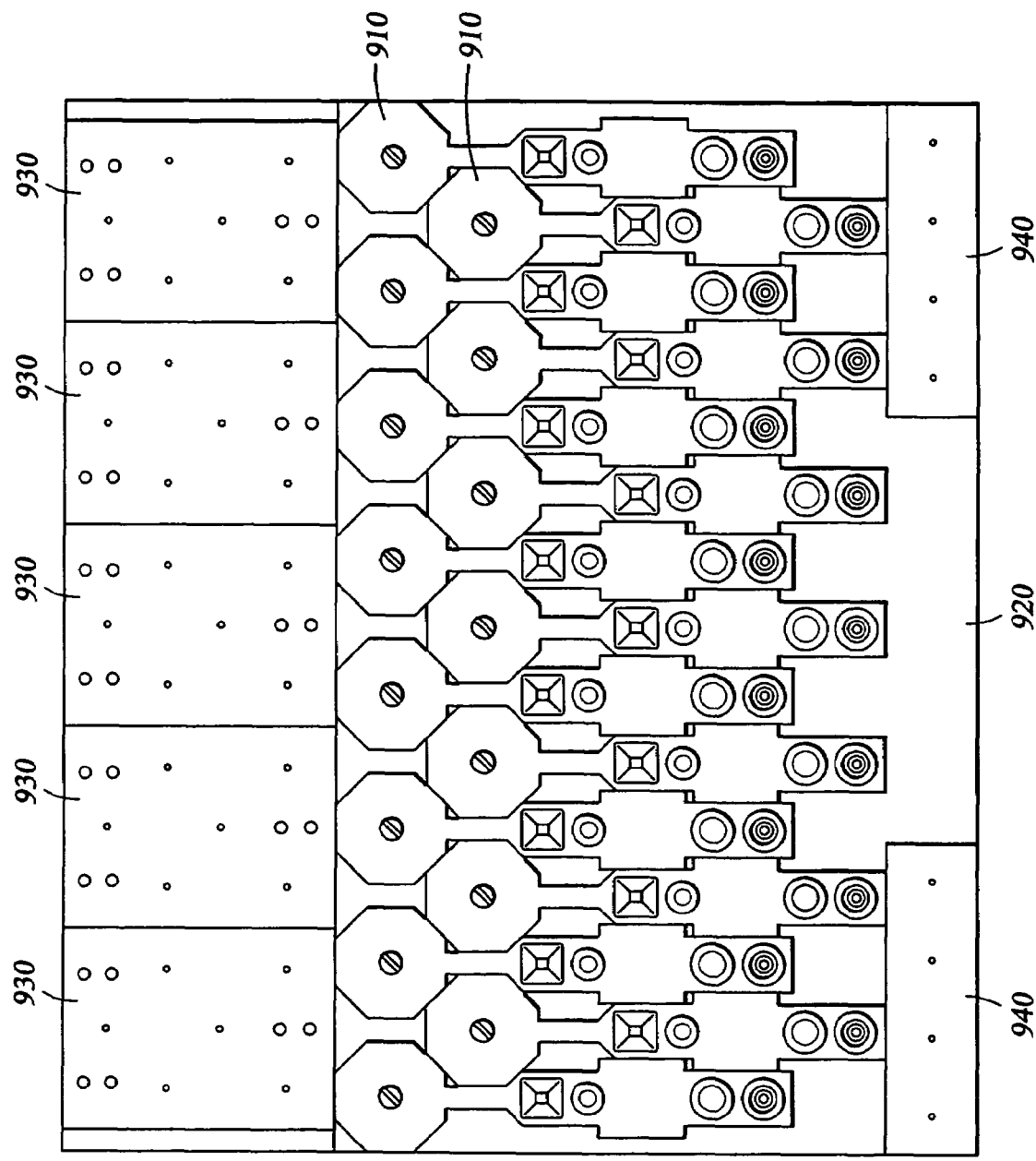
FIG. 9A is a top view of an integrated fluid delivery system 900 which includes a number of gas distribution assemblies 910 (gas sticks) of the kind shown in FIG. 6B, with the gas sticks attached to manifolding systems 930 and 940.
Figure 9B:
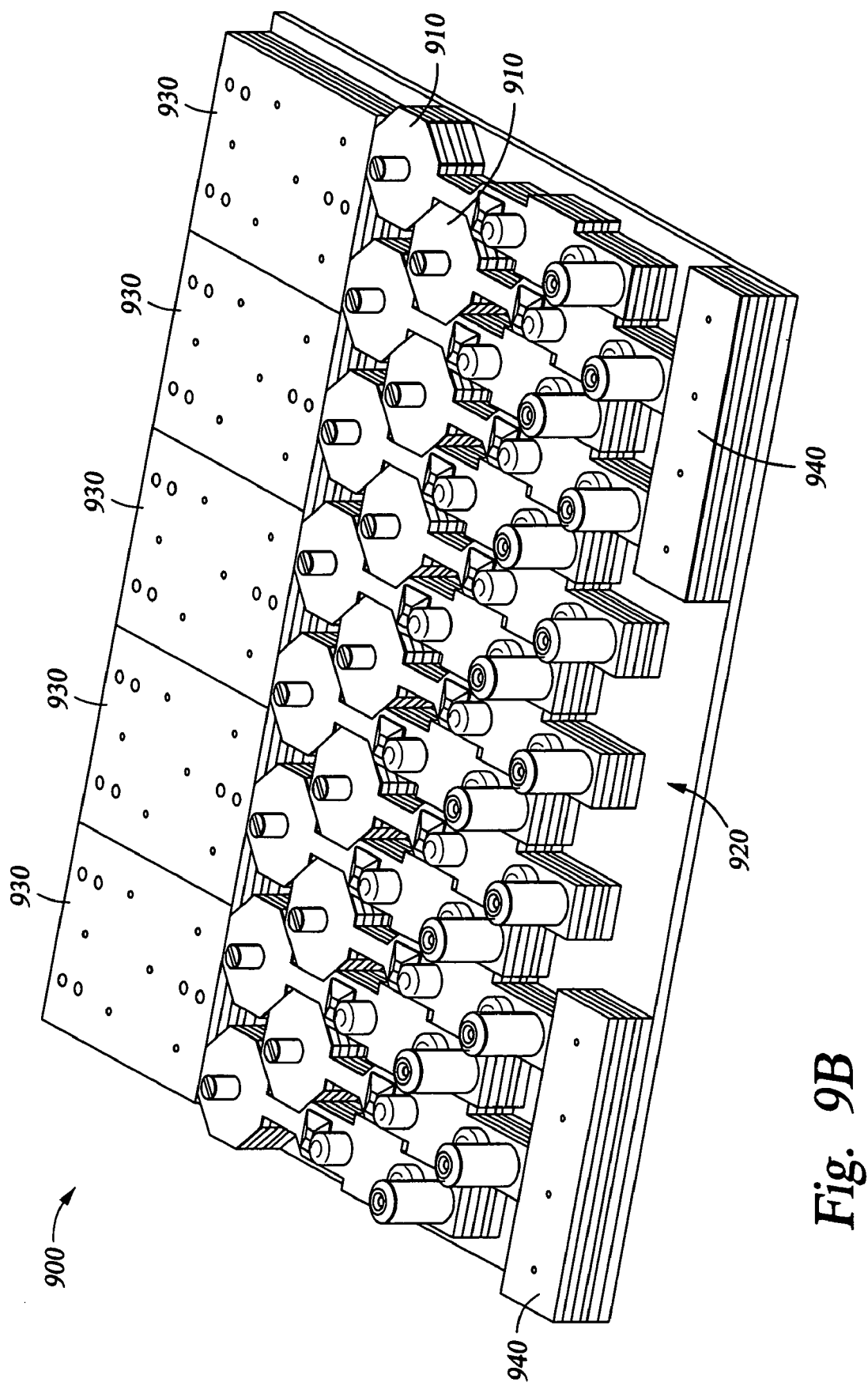
FIG. 9B is a three-dimensional view of the integrated fluid delivery system 900 shown in FIG. 9A.

FIG. 9A is a top view of an integrated fluid delivery system 900 which includes a number of gas distribution assemblies (gas sticks) 910 with surface-mounted component devices (similar to those shown in FIG. 6B). Integrated fluid delivery system 900 is mounted to base plate 920, and also includes input manifolds 930 and output manifold 940. FIG. 9B is a three-dimensional side view of the integrated fluid delivery system 900 shown in FIG. 9A, which illustrates the amount of integration of the individual component devices into the diffusion bonded substrate.

An integrated fluid delivery system described above and shown in FIGS. 9A and 9B can be used in conjunction with any processing equipment which requires the use of various gases during a manufacturing process. With respect to semiconductor processing, for example and not by way of limitation, the fluid delivery system may be used in combination with etch chambers, chemical vapor deposition (CVD) chambers, and physical vapor deposition (PVD) chambers.

One of the advantages of the integrated fluid delivery system 900 illustrated in FIG. 9B is that individual gas distribution assemblies (gas sticks) 910 may be removed from the fluid delivery system and replaced with a new gas distribution assembly at a reasonable cost. This makes it possible to minimize the down time of the entire semiconductor processing system when one or more fluid delivery component devices fails to perform for some reason. An individual gas distribution assembly may be removed and repaired off line, without the need for costly plumbing and replumbing time. If the individual gas distribution assembly cannot be repaired, the materials of construction may be recycled.

The conserved space, integrated gas distribution network architectures of the invention are cheaper to fabricate than the conventional larger-sized systems because they require much less material for fabrication, and because the manufacturing processes (chemical etching and diffusion bonding) used to fabricate the assemblies are scalable in size to meet the application and scalable in terms of production quantity, to provide cost economy.

The diffusion bonding techniques described above can also be used to attach a semiconductor processing chamber component to a fluid handling network component. The fluid handling network component may be a gas distribution assembly, or may be any of the component devices listed previously, such as, for example, manually operated valves, automatic valves, pressure and temperature sensors, flow controllers, filters, pressure regulators, check valves, metering valves, needle valves, and purifiers. The semiconductor processing chamber component to which a fluid handling network component is bonded may be, for example and not by way of limitation, a flange or entry portal to an etch chamber, a chemical vapor deposition (CVD) chamber, or a physical vapor deposition (PVD) chamber, for example.

The above-described embodiment is provided to enable one skilled in the art to understand the concepts which are disclosed and claimed herein, and is not intended to limit the scope of the present invention. One skilled in the art, in view of the disclosure in this application may expand the concepts and the materials which may be used for various elements of the layered fluid channels, sensors, actuators, and valves, to correspond with the subject matter of the invention claimed below.

We claim:

1. An in-line filter present within a layered substrate which forms at least a portion of a fluid flow channel, said layered substrate comprising a plurality of adhered metal layers, including a series of layers having shaped through holes formed therein, wherein a portion of said shaped through holes are positioned in an alignment which forms a cavity, wherein said cavity is filled with a sintered media which acts as a filtering agent, wherein another portion of said shaped through holes provides an entry to and an exit from said in-line filter, and wherein at least a portion of said adhered metal layers are diffusion bonded layers.

2. An in-line filter in accordance with claim 1, wherein said in-line filter is completely integrated into a fluid flow network, so that fluid flowing through said fluid flow network is filtered in line as said fluid flows through said fluid flow network.

3. An in-line filter, in accordance with claim 1 or claim 2, wherein one or more component devices are attached to said layered substrate downstream of said exit from said in-line filter.

4. An in-line filter in accordance with claim 2, wherein a valve attached to said layered substrate is located upstream of said in-line filter.

5. An in-line filter in accordance with claim 1, wherein one or more of said diffusion bonded metal layers has a thickness ranging from about 0.0005 inches to about 0.06 inches.

6. An in-line filter in accordance with claim 5, wherein one or more of said diffusion bonded metal layers has a thickness ranging from about 0.003 inches to about 0.05 inches.

7. An in-line filter in accordance with claim 1, wherein one or more of said diffusion bonded metal layers is comprised of a percent by weight composition of about 41% Co, about 21% Cr, about 16% Ni, about 11.4% Fe, about 8% Mo, about 2.5% Mn, and about 0.15% C.

8. An in-line filter in accordance with claim 5, wherein one or more of said diffusion bonded metal layers is comprised of a percent by weight composition of about 41% Co, about 21% Cr, about 16% Ni, about 11.4% Fe, about 8% Mo, about 2.5% Mn, and about 0.15% C.

9. An in-line filter in accordance with claim 8, wherein one or more of said diffusion bonded metal layers has a thickness ranging from about 0.003 inches to about 0.05 inches.

10. An in-line filter in accordance with claim 8, wherein one or more of said diffusion bonded metal layers has a thickness of about 0.004 inches.

11. An in-line filter in accordance with claim 1 wherein one or more of said diffusion bonded metal layers is comprised of series 400 stainless steel.

12. An in-line filter in accordance with claim 11, wherein one or more of said diffusion bonded metal layers has a thickness ranging from about 0.0005 inches to about 0.06 inches.

13. An in-line filter in accordance with claim 12 wherein one or more of said diffusion bonded metal layers has a thickness ranging from about 0.003 inches to about 0.05 inches.

14. An in-line filter in accordance with claim 13 wherein one or more of said diffusion bonded metal layers of said in-line filter has a thickness of about 0.025 inches.

15. An in-line filter in accordance with claim 1 wherein one or more of said diffusion bonded metal layers is comprised of a percent by weight composition of about 12% Cr, about 1% Mn, about 1% Si, about 0.50% Ni, about 0.15% C, about 0.04% P, about 0.03% S, and a balance of Fe.

16. An in-line filter in accordance with claim 15, wherein one or more of said diffusion bonded metal layers has a thickness ranging from about 0.0005 inches to about 0.06 inches.

17. An in-line filter in accordance with claim 16, wherein one or more of said diffusion bonded metal layers has a thickness ranging from about 0.003 inches to about 0.05 inches.

* * * * *